United States Patent [19]

Okino et al.

[11] Patent Number: 5,402,354

[45] Date of Patent: Mar. 28, 1995

[54] CONTROL APPARATUS AND CONTROL METHOD FOR MACHINE TOOLS USING FUZZY REASONING

[75] Inventors: Fumito Okino; Yasuhiko Murai, both of Kyoto, Japan

[73] Assignee: Mitsubishi Jukogyo Kabushiki Kaisha, Tokyo, Japan

[21] Appl. No.: 774,086

[22] Filed: Oct. 9, 1991

[30] Foreign Application Priority Data

| Oct. 12, 1990 | [JP] | Japan | 2-272350 |
| Oct. 19, 1990 | [JP] | Japan | 2-279268 |
| Nov. 9, 1990 | [JP] | Japan | 2-302502 |
| Nov. 9, 1990 | [JP] | Japan | 2-302503 |

[51] Int. Cl.⁶ .................... G06F 15/46; B24B 49/00
[52] U.S. Cl. .................. 364/474.16; 364/474.06; 395/904; 451/5
[58] Field of Search ......... 364/474.06, 474.15–474.17, 364/551.02

[56] References Cited

U.S. PATENT DOCUMENTS

| 4,561,218 | 12/1985 | Dzewnltowski et al. | 51/290 |
| 4,731,954 | 3/1988 | Lilienfein | 51/165.71 |
| 4,757,307 | 7/1988 | Keramuti et al. | 340/680 |
| 4,924,842 | 5/1990 | Rao et al. | 125/11.01 |
| 5,117,083 | 5/1992 | Kawamura | 395/904 |

FOREIGN PATENT DOCUMENTS

| 2-95543 | 9/1988 | Japan . |
| 650186 | 7/1985 | Switzerland . |
| 660995 | 6/1987 | Switzerland . |

OTHER PUBLICATIONS

Excerpt from text by Palm "Completion Orientation of the Control of a Robot on the Basis of a Fuzzy Logic" 1990.
Excerpt from an article by Mohr "A Method for Pendulum Polishing with and Without Adaptive Insertion Positioning" 1977.
Excerpt from an article by Wiele "Thermally Influencing Deviations in Work Piece Machining" 1974.
Yoshiro Sakai et al., "On a control system for cutting process", Jul. 13–14, 1984.
X. D. Fang et al., "An Expert system based on a fuzzy mathematical model for chip breakability assessments in automated machining," Mar. 25–28, 1990.
T. T. Chen et al., "A surface grinding process advisory system with fuzzy logic", pp. 67–77, Dec. 1–6, 1991.
Excerpt from Kammermeyer & Roos "Automization of Outer Round Polishing" 1986.

Primary Examiner—James Trammell
Attorney, Agent, or Firm—McAulay Fisher Nissen Goldberg & Kiel

[57] ABSTRACT

A method and an apparatus for controlling a machine tool including cylindrical grinding machine in which the specific portion to be controlled on a machine tool is automatically controlled by fuzzy reasoning on the basis of the measured data values about the specified portion composing said machine tool. With this method and apparatus, the change points of infeed speed and the spark out starting point can be automatically decided, and the necessity of changing of coolant and dressing can be automatically judged.

4 Claims, 32 Drawing Sheets

B: X₁ IS LARGE
M: X₁ IS MEDIUM
S: X₁ IS SMALL

B: X₂ IS BIG
M: X₂ IS MEDIUM
S: X₂ IS SMALL

VB: Y₁ IS VERY BIG
B: Y₁ IS BIG
M: Y₁ IS MEDIUM
S: Y₁ IS SMALL
VS: Y₁ IS VERY SMALL

POINT OF CHANGE OF DEPTH SETTING VELOCITY
FROM ROUGH TO FINE GRINDING  $Y_1 (\mu m)$

| $X_1$ \ $X_2$ | S | M | B |
|---|---|---|---|
| S | M | B | VB |
| M | S | M | B |
| B | VS | S | M |

B : $X_1$ IS LARGE
M : $X_1$ IS MEDIUM
S : $X_1$ IS SMALL

B : $X_2$ IS BIG
M : $X_2$ IS MEDIUM
S : $X_2$ IS SMALL

POINT OF CHANGE OF DEPTH SETTING VELOCITY
FROM FINE GRINDING TO SPARK OUT $Y_1$ (μm)

| $X_2$ \ $X_1$ | S | M | B |
|---|---|---|---|
| | S | M | B | VB |
| | M | S | M | B |
| | B | VS | S | M |

B: $X_1$ IS LARGE
M: $X_1$ IS MEDIUM
S: $X_1$ IS SMALL

VARIATION OF DIAMETER OF WORKPIECE BEING CUT $X_1$ (μm)

B: $X_2$ IS BIG
M: $X_2$ IS MEDIUM
S: $X_2$ IS SMALL

AMOUNT LEFT FROM CUTTING $X_2$ (μm)

VB: Y₁ IS VERY BIG
B: Y₁ IS BIG
M: Y₁ IS MEDIUM
S: Y₁ IS SMALL
VS: Y₁ IS VERY SMALL

POINT OF CHANGE OF DEPTH SETTING VELOCITY FROM FINE GRINDING TO SPARK OUT  $Y_1$ ($\mu$m)

| $X_2$ \ $X_1$ | | S | M | B |
|---|---|---|---|---|
| | S | M | B | VB |
| | M | S | M | B |
| | B | VS | S | M |

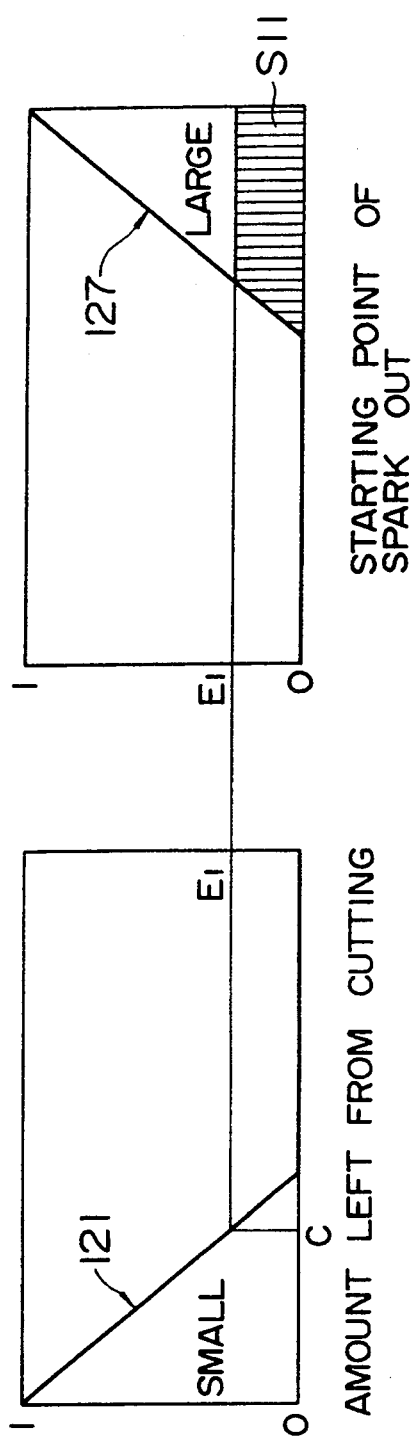
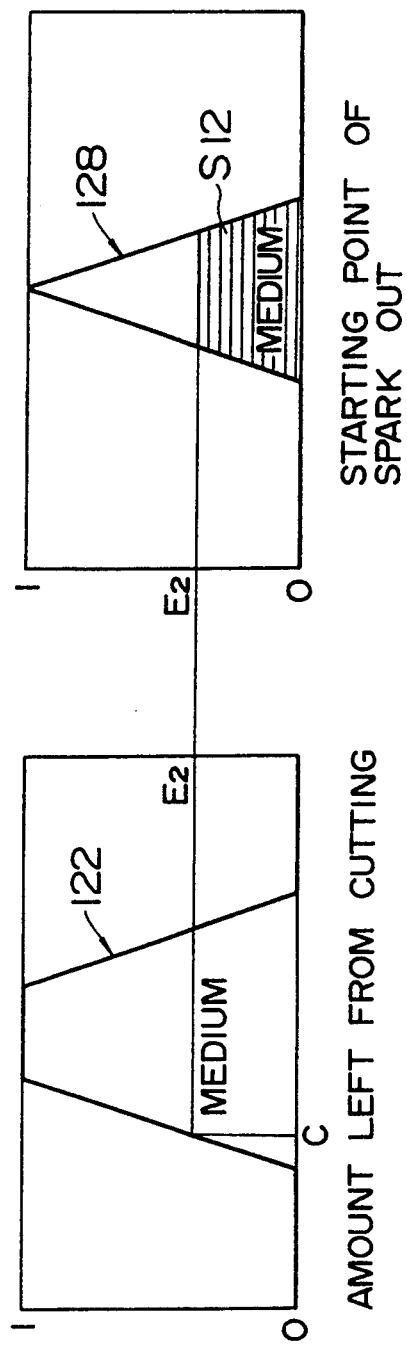
FIG. 19(a)
FIG. 19(b)

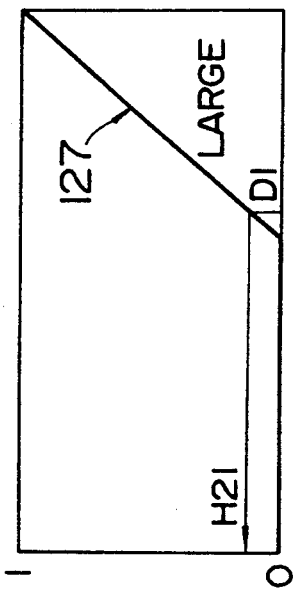
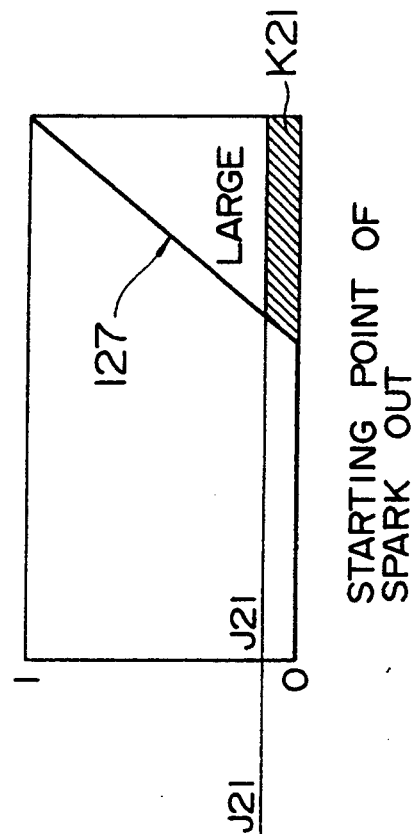
FIG. 21(a)
FIG. 21(b)

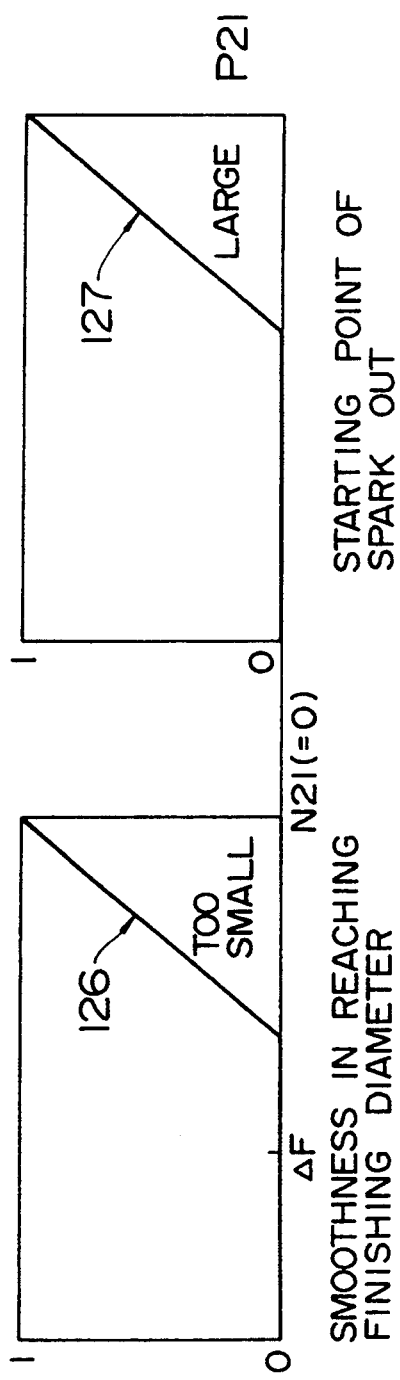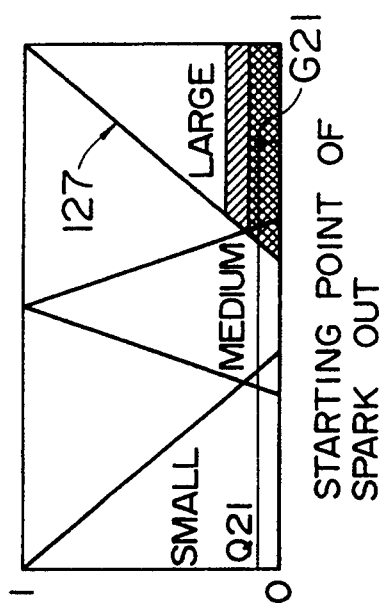
FIG. 21(d)
FIG. 21(e)

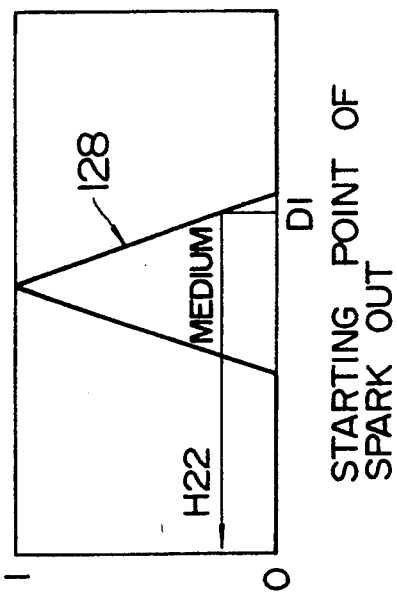
F I G. 22(a)
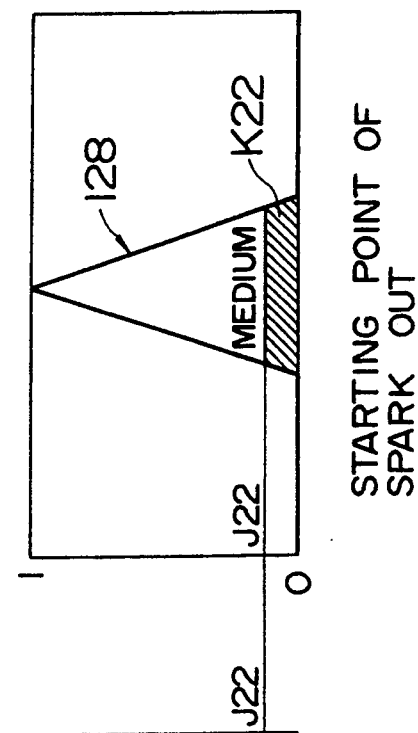
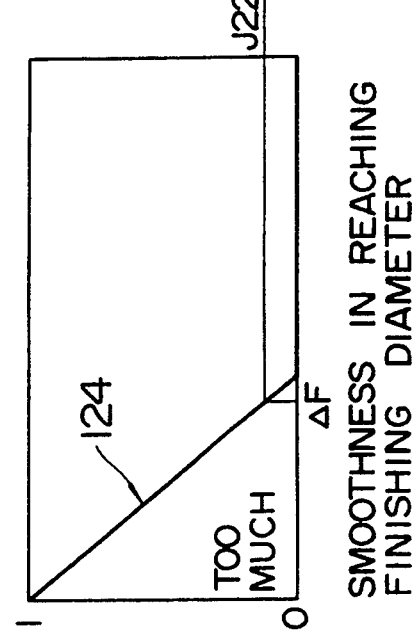
F I G. 22(b)

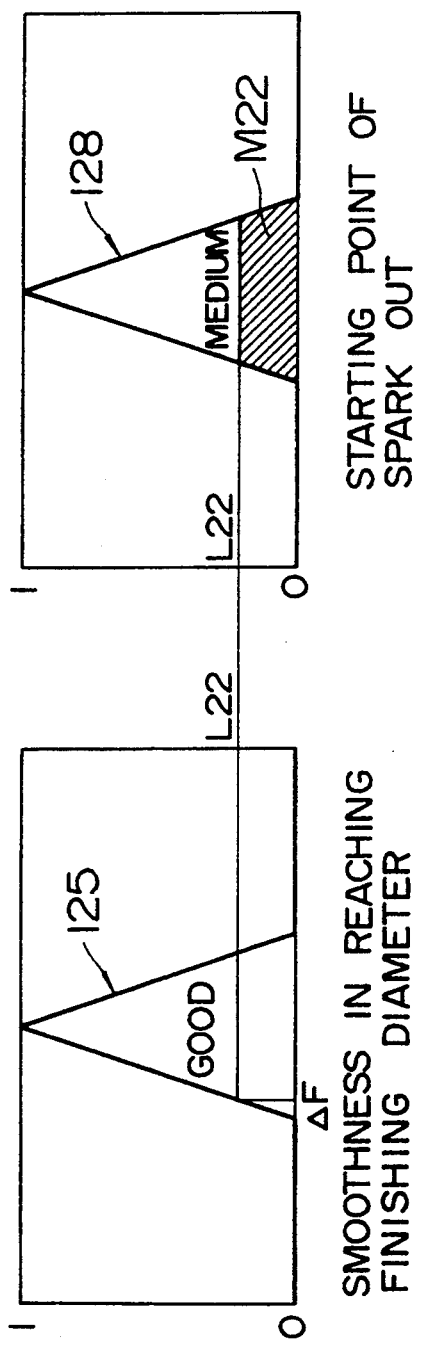

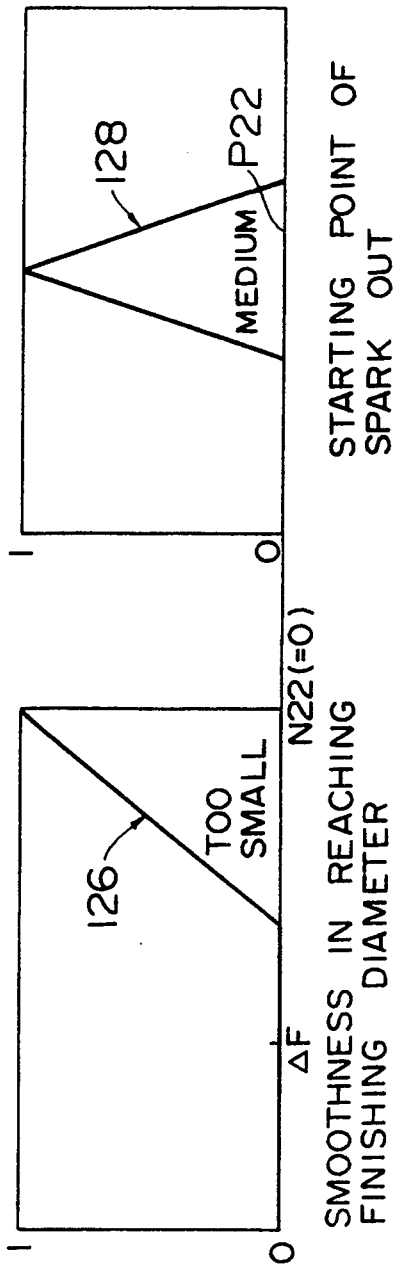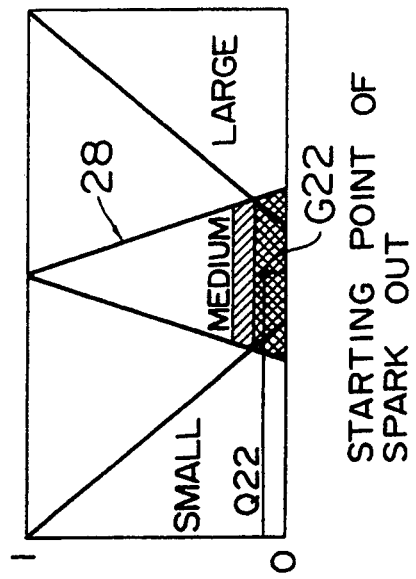
FIG. 22(d)
FIG. 22(e)

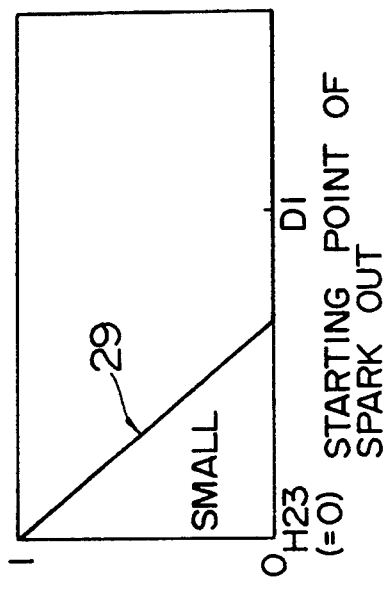
F I G. 23(a)
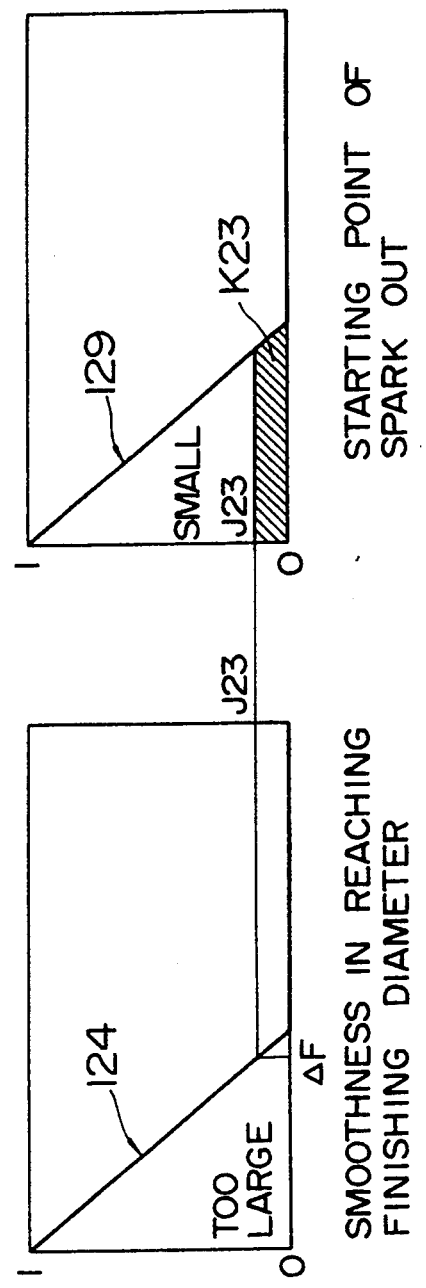
F I G. 23(b)

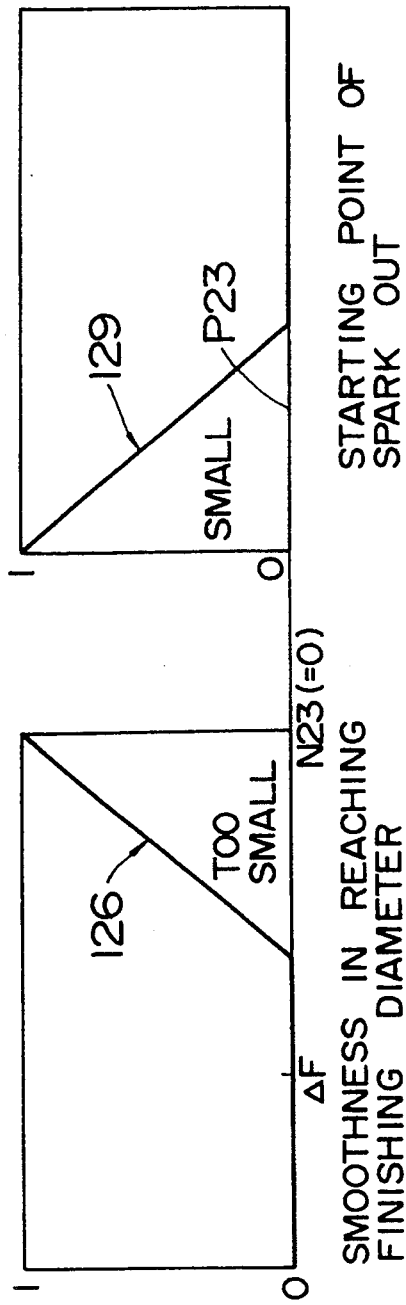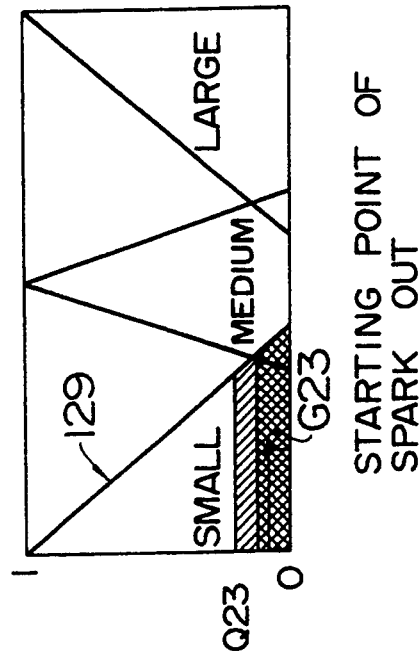
FIG. 23(d)
FIG. 23(e)

F I G. 24(a)
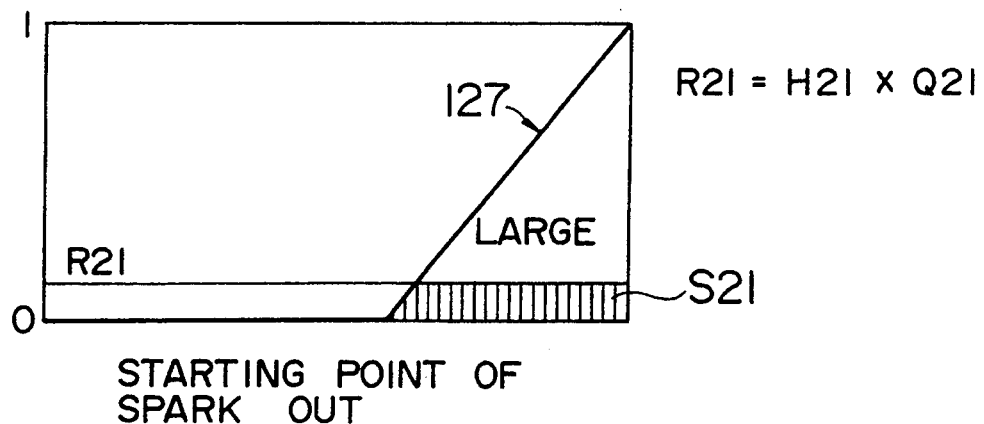
F I G. 24(b)
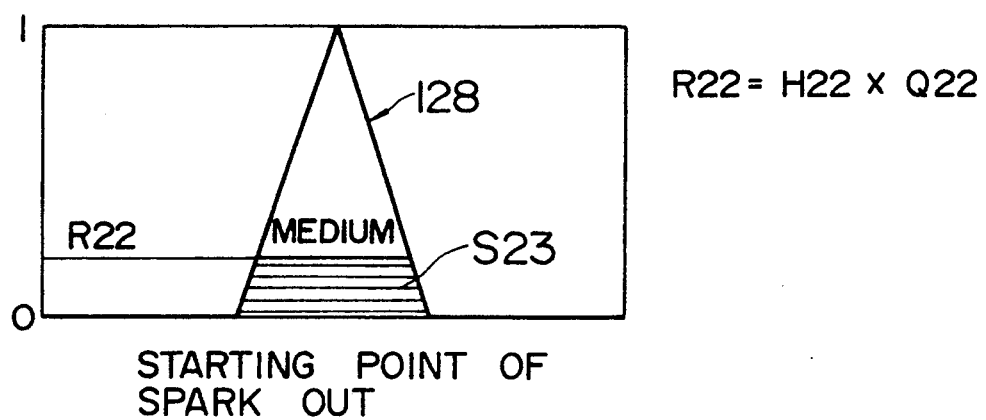

$R23 = H23 \times Q23$

F I G. 25
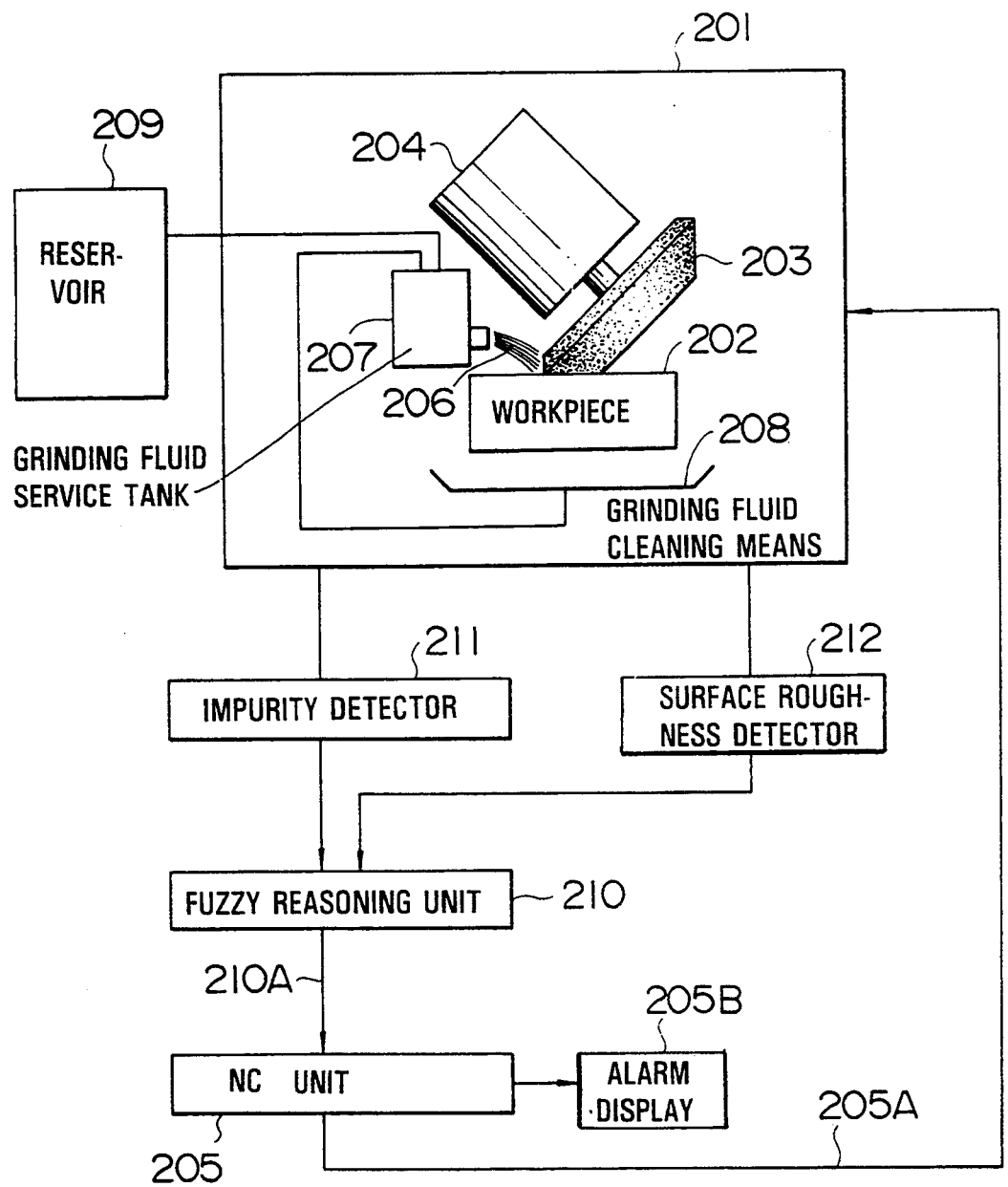

B: X₁ IS BIG
M: X₁ IS MEDIUM
S: X₁ IS SMALL

CHIP CONTENT X₁ (%)

B: X₂ IS BIG
M: X₂ IS MEDIUM
S: X₂ IS SMALL

SURFACE ROUGHNESS X₂ (μ)

VB: Y IS VERY BIG
 B: Y IS BIG
 M: Y IS MEDIUM
 S: Y IS SMALL
VS: Y IS VERY SMALL

NECESSITY OF CHANGING
GRINDING FLUID  Y (%)

| $X_2$ \ $X_1$ | S | M | B |
|---|---|---|---|
| S | VS | S | M |
| M | S | M | B |
| B | M | B | VB |

B: $X_1$ IS LARGE
M: $X_1$ IS MEDIUM
S: $X_1$ IS SMALL

B: $X_2$ IS LARGE
M: $X_2$ IS MEDIUM
S: $X_2$ IS SMALL

VB: Y IS VERY LARGE
 B: Y IS LARGE
 M: Y IS MEDIUM
 S: Y IS SMALL
VS: Y IS VERY SMALL

NECESSITY OF DRESSING Y (%)

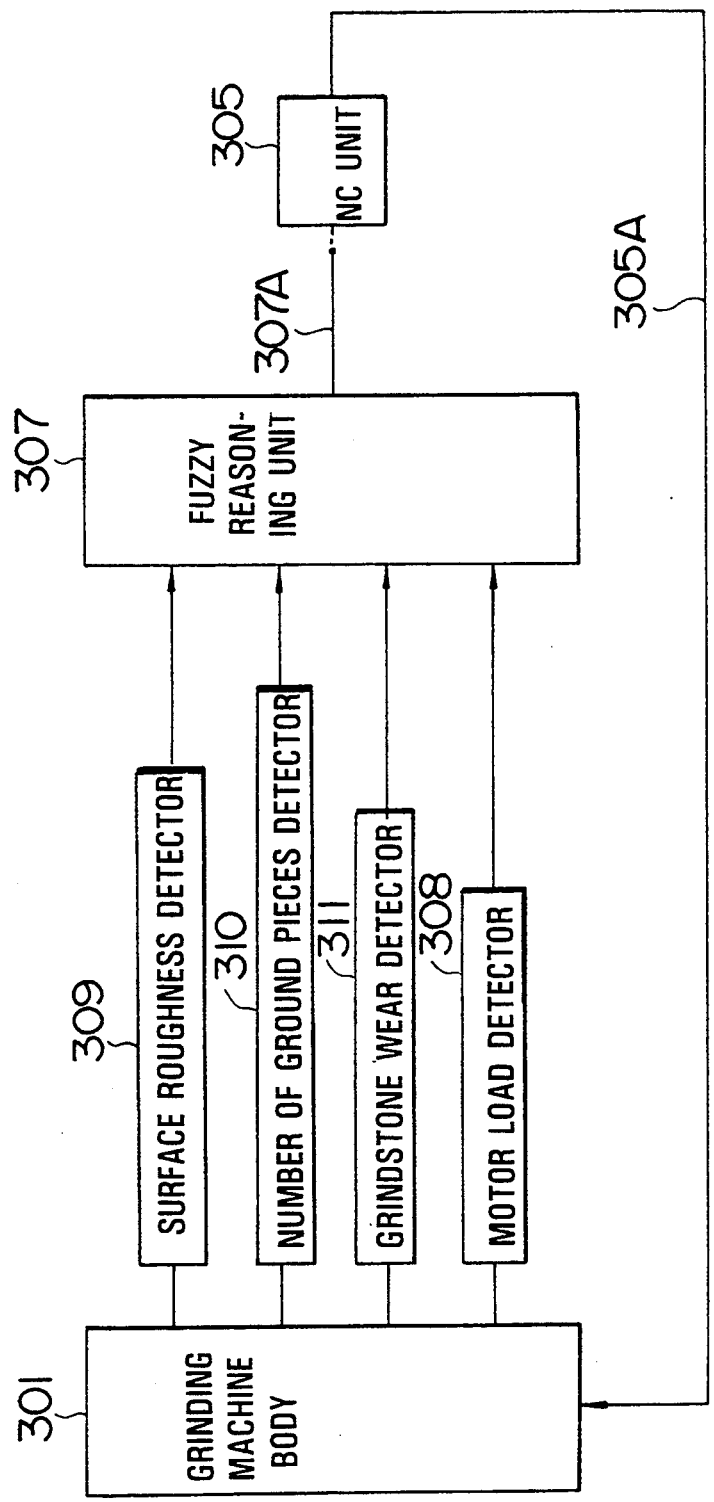
F I G. 36

CONTROL APPARATUS AND CONTROL METHOD FOR MACHINE TOOLS USING FUZZY REASONING

BACKGROUND OF THE INVENTION

1. Field of the Invention

This invention relates to a control apparatus and control method of machine tools including grinding machines.

More specifically, it relates to an apparatus which automatically controls the change points of constant infeed speed for each workpiece by applying fuzzy reasoning.

Also, the invention relates to a method for automatically controlling the starting point of spark out in the plunge, traverse, taper, or shoulder grinding cycle for each workpiece by applying fuzzy reasoning.

Furthermore, this invention relates to an apparatus for automatically judging, by applying fuzzy reasoning, whether the change or makeup of coolant for machine tools including grinding machines is necessary.

Still furthermore, this invention relates to an apparatus for automatically judging, by applying fuzzy reasoning, whether truing or dressing of grinding wheels on grinding machines is necessary.

2. Description of the Related Art

In the conventional grinding cycle for cylindrical grinding machines, the change points of constant infeed speed of grinding wheel were fixed for the same types of workpieces in both cases of the change from rough grinding to fine grinding and the change from fine grinding to spark out. The spark out starting point means, for example in the plunge grinding cycle, the workpiece diameter at which the grinding wheel stops infeeding, and in the shoulder grinding cycle the workpiece width at which the grinding wheel stops infeeding.

The fixed infeed speed change points for a grinding wheel presents the following disadvantages:

(1) Shortening of machining time is limited. Particularly when the change point from rough grinding to fine grinding is fixed, the shortening is very restricted.

(2) Variations in quality occur.

(3) Variations in machining accuracy occur.

The reasons for these disadvantages are as follows:

(i) The grinding quality of the wheel, though being high immediately after dressing, is gradually degraded by glazing or loading.

(ii) When the infeed speed change points including the spark out starting point are fixed, the change point from rough to fine grinding or the change point from fine grinding to spark out is reached rapidly if the grinding quality of the wheel is high. Moreover, the time for attaining the finished dimensions (finished diameter or finished width) after the start of spark out is short, but infeeding may become excessive, and the finished dimensions cannot be obtained smoothly, which results in poor quality (surface roughness).

(iii) If the grinding quality of the wheel is low, the surface roughness is good, but same amount becomes left from cutting. Also, it takes longer to attain the finished dimensions.

(iv) Depending on the grinding quality of the wheel, excessive infeeding occurs or some portion of a workpiece becomes left out from cutting, resulting in variations in machining accuracy and variations in surface roughness. Therefore, the change points of constant infeed speed including the spark out starting point are set at a fixed position slightly larger than the usual position to obtain the finished diameter or finished width smoothly and also to prevent excessive infeed even when the grinding quality of the wheel is high.

(v) As a result, the machining time becomes longer and varies greatly as the grinding quality of the wheel degrades. If the grinding quality of the wheel is so poor that a large amount becomes left from cutting, an auxiliary pick is required; it takes further longer to attain the finished dimensions.

The adaptive control grinding on cylindrical grinding machines is also known as disclosed in Japanese Patent Publication No. 3951/1985 (60-3951). In this technology, modeling of grinding conditions is performed in advance by using numerical formulae. Computations of change points of constant infeed speed are made during grinding operation by inputting the actually measured workpiece diameter and other factors into the control unit. The adaptive control grinding, however, has the following disadvantages.

(a) The grinding conditions changes every moment depending on the conditions of workpiece, the conditions of grinding wheel and so on. If an attempt is made to strictly model the grinding conditions, therefore, a huge number of parameters are required, leading to increased computation time. This increase in computation time imposes a limit on sampling intervals and prolongs them. Consequently, this control method cannot follow minute changes in grinding conditions.

(b) Inversely, if the grinding conditions are simplified for ease of modeling, the accuracy of adaption to each workpiece becomes poor.

Another problem with grinding machines is the judgment of time when grinding fluid is changed or replenished.

On machine tools including grinding machines in which a coolant circulates, an operator judges whether the change or makeup of coolant including grinding fluid is necessary. There are many factors the operator must decide; therefore, when a factory is made unmanned, it is difficult to properly change or replenish coolant without waste.

Still another problem with grinding machines is the judgment of timing of truing or dressing of grinding wheels.

To judge the timing of truing or dressing of grinding wheels, the number of workpieces after which truing or dressing becomes required is decided by measuring the grinding accuracy after grinding a certain number of workpieces.

This conventional method takes considerable time for the preliminary work because a number of workpieces must be ground in advance and the grinding accuracy must be measured.

Since the timing of truing or dressing is decided in advance, truing or dressing has to be performed earlier than actually necessary to prevent the grinding accuracy from becoming low. Therefore, truing or dressing is performed when sufficient grinding accuracy Can still be obtained, and dressing is carried out more often than it is actually necessary.

SUMMARY OF THE INVENTION

In view of the foregoing, it is a first object of the present invention to provide a grinding machine control apparatus which automatically determines the change points of constant infeed speed of grinding wheels for each workpiece to attain improvement in grinding accuracy, stabilization of quality, and shortening of machining time.

It is a second object of the present invention to provide a control method for setting the starting point of spark out for each workpiece by applying fuzzy reasoning to attain improvements in grinding accuracy, stabilization of quality, and shortening of machining time.

It is a third object of the present invention to provide an apparatus which can automatically judge the necessity for change or makeup of coolant.

It is a fourth object of the present invention to provide an apparatus which can automatically judge the necessity of truing or dressing during or after machining.

The grinding machine control apparatus for accomplishing the first object of this invention comprises a grinding wheel which is rotated by a driving means, a headstock for holding a workpiece, a moving means for performing infeed at a plurality of constant speeds by moving at least either the grinding wheel or the headstock, a sensor for detecting the grinding conditions of a workpiece, and a control means for controlling the change points of constant infeed speed on the basis of the output signal from the sensor, and is characterized by comprising a fuzzy reasoning means which automatically controls the change points of a plurality of otherwise constant infeed speeds by fussy reasoning on the basis of the values representing grinding conditions detected by the sensor. The above-mentioned constant speeds can include a speed of zero.

When infeed is being performed at a certain constant speed, the change point can be automatically determined by fuzzy reasoning from the detected values representing grinding conditions. When this change point is reached, infeed is performed at the next constant speed. In the case of spark out, the infeed speed becomes zero.

The control method of grinding machines for accomplishing the second object of this invention comprises the steps of determining a first spark out starting point as a temporary spark out starting point by fuzzy reasoning on the basis of measured values representing grinding conditions during the grinding operation before the start of spark out, performing a simulation to judge whether the finishing dimension is smoothly obtained when assuming the spark out to take place at this first spark out starting point, determining a second spark out starting point by performing fuzzy reasoning again on the basis of the smoothness by which the finished dimension is reached and which is a result of the simulation, and executing spark out at the second spark out starting point.

The apparatus for accomplishing the third object of this invention, which is used to automatically judge the necessity for the change or makeup of coolant on machine tools having a coolant supplying means for supplying coolant to the machining point and a coolant cleaning means for recovering and cleaning the coolant, comprises a sensor for detecting the conditions of at least either the coolant or the workpiece, and a fuzzy reasoning means for automatically judging the necessity for at least one of the makeup and change of coolant by fuzzy reasoning on the basis of input values from the sensor.

According to this apparatus of the invention, the conditions of coolant or a workpiece are detected by the sensor during or after machining. From the detected conditions, the necessity for makeup or change of the coolant is automatically judged by fuzzy reasoning.

The apparatus for accomplishing the fourth object of this invention, which is used to automatically judge the necessity of dressing on grinding machines having a dresser means for performing at least one of truing and dressing operations of grinding wheels and a moving mechanism for relatively moving the grinding wheel and the dresser means, comprises a sensor for detecting the conditions of at least one of the workpiece and the grinding wheel, and a fuzzy reasoning means for automatically judging the necessity for at least one of the truing and dressing operations of the grinding wheel by fuzzy reasoning on the basis of input values from the sensor.

According to this apparatus of the invention, the conditions of either one or both of the grinding wheel and the workpiece are detected by the sensor. From the detected conditions, the necessity of truing or dressing of a grinding wheel is automatically judged by fuzzy reasoning.

BRIEF DESCRIPTION OF THE DRAWINGS

FIGS. 19a–19d are diagrams for explaining the computation of the first spark out starting point, FIGS. 21a–24d are diagrams for explaining the computation of the second spark out starting point, FIG. 25 is a block diagram showing the configuration of a fourth embodiment of this invention, FIG. 36 is a block diagram showing the configuration of a seventh embodiment of this invention.

DESCRIPTION OF THE PREFERRED EMBODIMENT

By reference to the drawings, this invention is explained together with the preferred embodiments.

Figure 1:
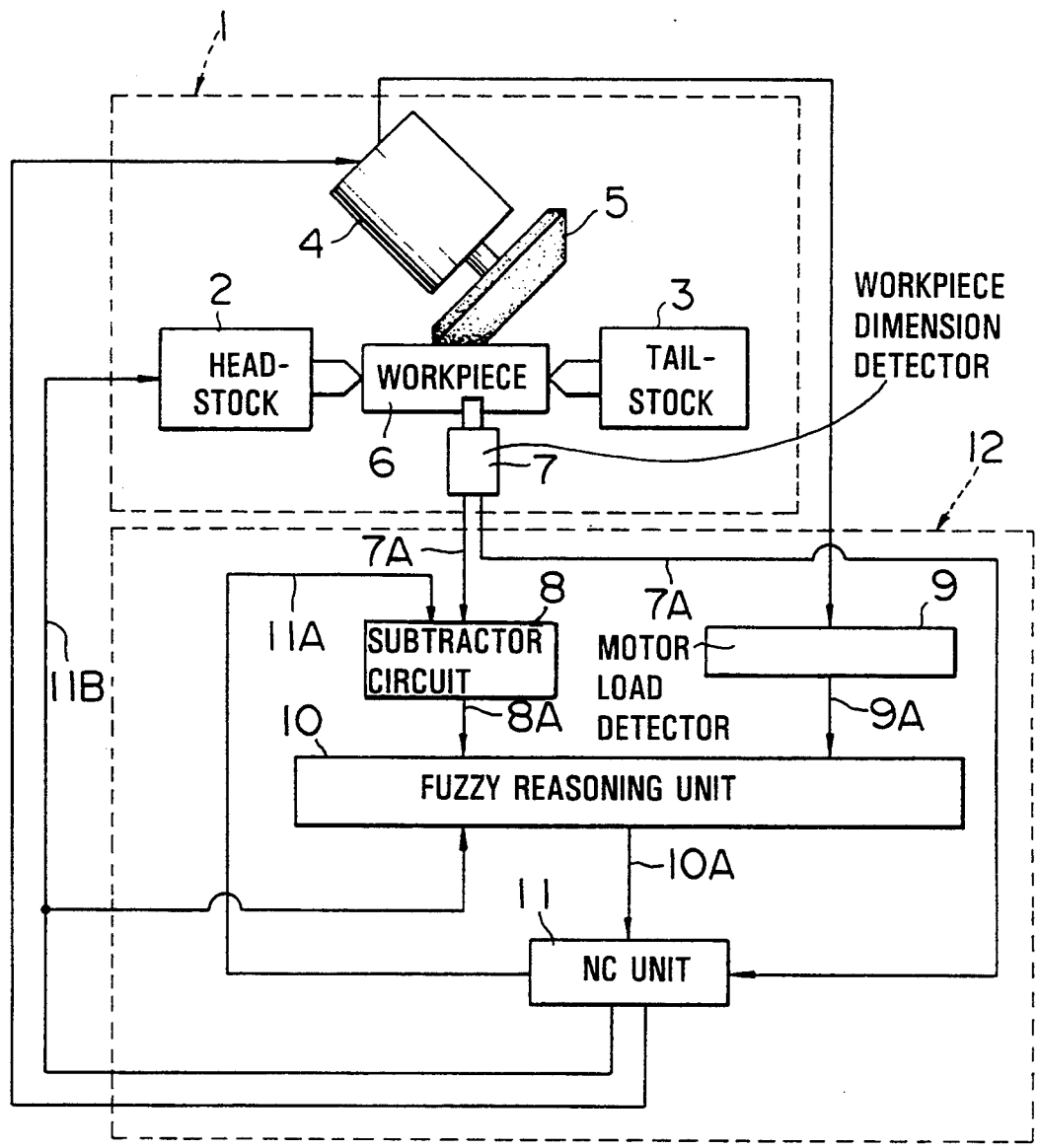
FIG. 1 is a block diagram showing the configuration of a first embodiment of this invention.

FIG. 1 is a block diagram showing the configuration of a first embodiment of this invention. By using a workpiece dimension detector 7 and a motor load detector 9, the motor load and the amount left from cutting are input into a fuzzy reasoning unit 10 as measured values representing grinding conditions. On the basis of these values, fuzzy reasoning is performed as shown in FIGS. 2 through 9 to control the change points for the infeed speed which is otherwise constant.

Referring to FIG. 1, a workpiece 6 is held by a headstock 2 or by the headstock 2 and a tail stock 3, and rotated on the cylindrical grinding machine body 1. The grinding wheel 5 is rotated by a driving motor 4. The headstock 2 is moved together with the tail stock 3 by a moving means (not shown) to control the amount of infeed. Needless to say, the grinding wheel 5 only or both the grinding wheel 5 and the headstock 2 can be moved by the moving means to control the amount of infeed. The infeed speed controlled by the moving means is changed upon instructions of a control unit 12. It is constant until a change point is reached, and is changed into the next constant speed when the change point is reached.

The workpiece dimension detector 7 and the motor load detector 9 are installed on the grinding machine body 1.

The workpiece dimension detector 7, being of either contact or noncontact type, measures the dimension of the workpiece 6 (for example, diameter for plunge, traverse, or taper grinding and width for shoulder grinding) during grinding operation. For this purpose, an automatic sizing device of contact type is mainly used. The detection signal 7A output from the workpiece dimension detector 7 and the momentary set infeed of the grinding wheel 11A calculated from the NC instructions by an NC unit 11 are input into a subtractor circuit 8 in the control unit 12. The subtractor circuit 8 calculates the amount to be left from cutting 8A and inputs it into a fuzzy reasoning unit 10.

The motor load detector 9 detects the motor load during grinding operation by measuring the electric current load of the motor 4 during grinding. It inputs the detection signal 9A into the fuzzy reasoning unit 10. The motor on which the load is detected is the grinding wheel driving motor 4 here, but it may be a motor for rotating the workpiece 6.

The fuzzy reasoning unit 10 computes an infeed speed change point which is optimal for the grinding conditions (motor load and an amount to be left from cutting), and feeds the result (data) 10A to the NC unit 11.

The above computation is performed always during infeed at a certain constant speed (assuming to be the first constant infeed speed for now). The NC unit 11 receives the data 10A of an infeed speed change point, which is the result of the fuzzy reasoning, and the data 7A of the dimension measured by the workpiece dimension detector 7. When these values agree with each other, the NC unit 11 gives a speed change command 11B to the grinding machine body 1 so that the infeed speed changes into the next constant speed (the second constant infeed speed). Consequently, the grinding machine body 1 performs grinding operation at the predetermined second constant infeed speed. During this infeed, the fuzzy reasoning unit 10 performs the reasoning for the next infeed speed change point.

The subtractor circuit 8, the fuzzy reasoning unit 10, and the NC unit 11 may be configured as one unit. For safety, the output of the motor load detector 9 may be fed directly to the NC unit 11 without passing it through the fuzzy reasoning unit 10 when the output of the motor load detector 9 exceeds a standard value (usually 120%), so that appropriate safety measures can be taken. Instead of the NC command value, a measured value obtained using an infeed speed detector can be used as the set amount of infeed.

Next, the fuzzy reasoning unit 10 is described in detail. Here, it is assumed that, for example, the unit 10 performs 2-input 1-output fuzzy reasoning. The fuzzy reasoning unit 10 outputs the infeed speed change point which is optimal for the change from rough to fine grinding on the basis of the membership functions shown in FIGS. 2 through 4. Furthermore, the unit 10 outputs the infeed speed change point which is optimal for the change from fine grinding to spark out on the basis of the membership functions shown in FIGS. 6 through 8.

Figure 2:
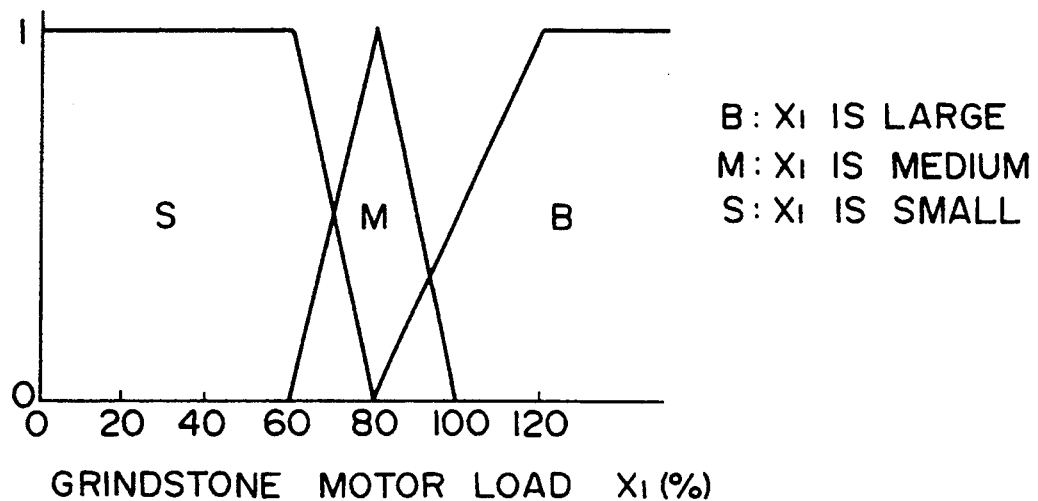
FIGS. 2 through 4, FIGS. 6 through 8, and FIGS. 11 through 13 are diagrams showing membership functions.
Figure 3:
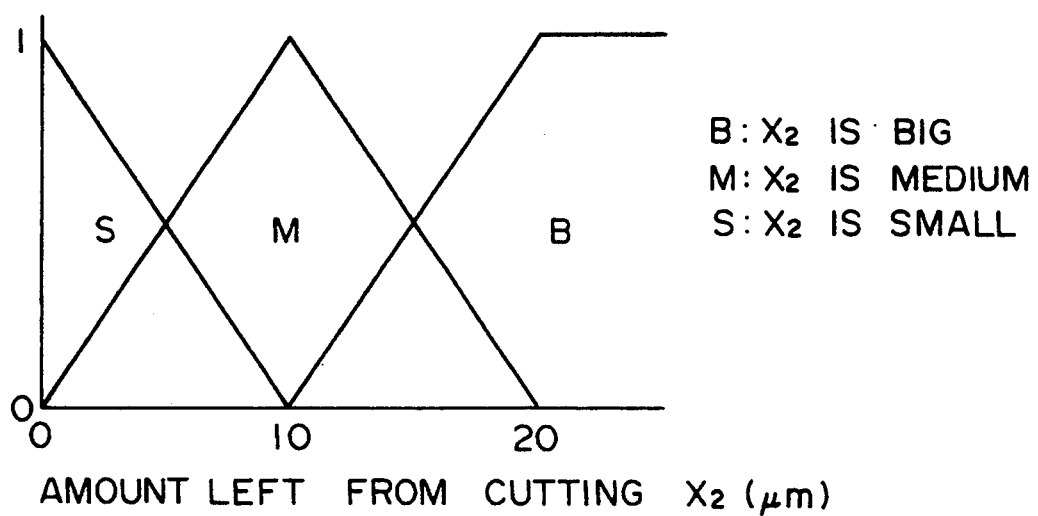
Figures 4, 5:
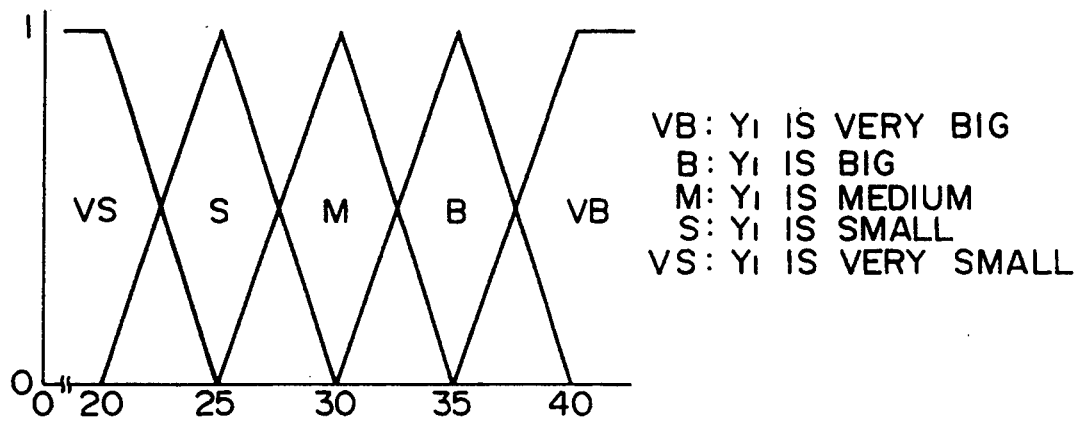
FIGS. 5, 9 and 14 are diagrams showing the matrixes of control rules.

First, the fuzzy reasoning for the infeed speed change point from rough to fine grinding is described. FIG. 2 shows an example of membership function in which the grindstone motor load $X_1$ from the motor load detector 9 is the input value. FIG. 3 shows an example of membership function in which the amount left from cutting $X_2$ obtained from the measured value from the workpiece dimension detector 7 and the set infeed calculated from the NC unit 11 is the input value. FIG. 4 shows an example of membership function in which the infeed speed change point from rough to fine grinding $Y_1$ (expressed by the difference form the finished dimension) is the output value. Part of the control rules used in the first embodiment are (a) and (b) described below. The matrix of control rules is shown in FIG. 5.

(a) If the grindstone motor load $X_1$ is large (B) and the amount left from cutting $X_2$ is small (S), the infeed speed change point from rough to fine grinding $Y_1$ is set to be very large (VB).

(b) If the grindstone motor load $X_1$ is small (S) and the amount left from cutting $X_2$ is large (B), the infeed speed change point from rough to fine grinding $Y_1$ is set to be very small (VS).

Next, the fuzzy reasoning for the infeed speed change point from fine grinding to spark out is described.

Figure 6:
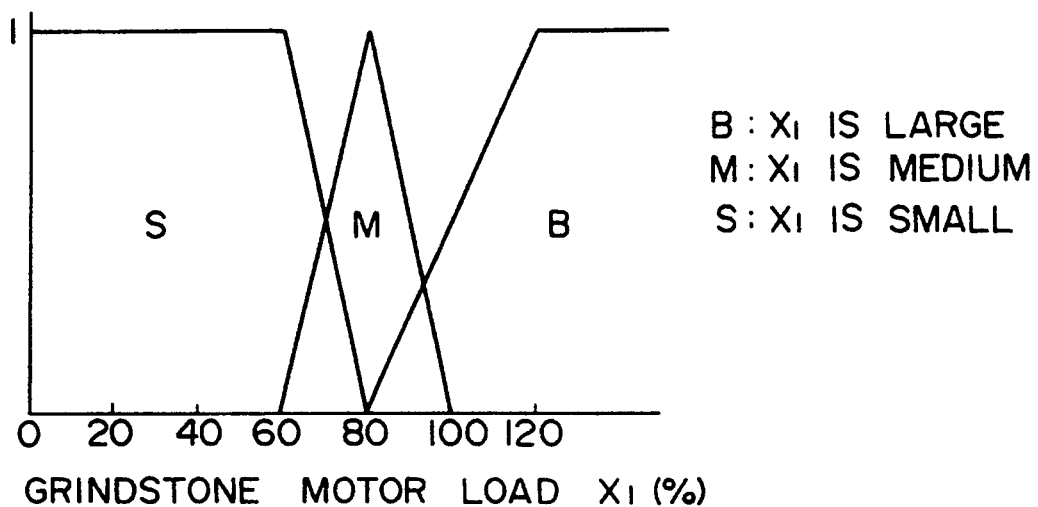
Figure 7:
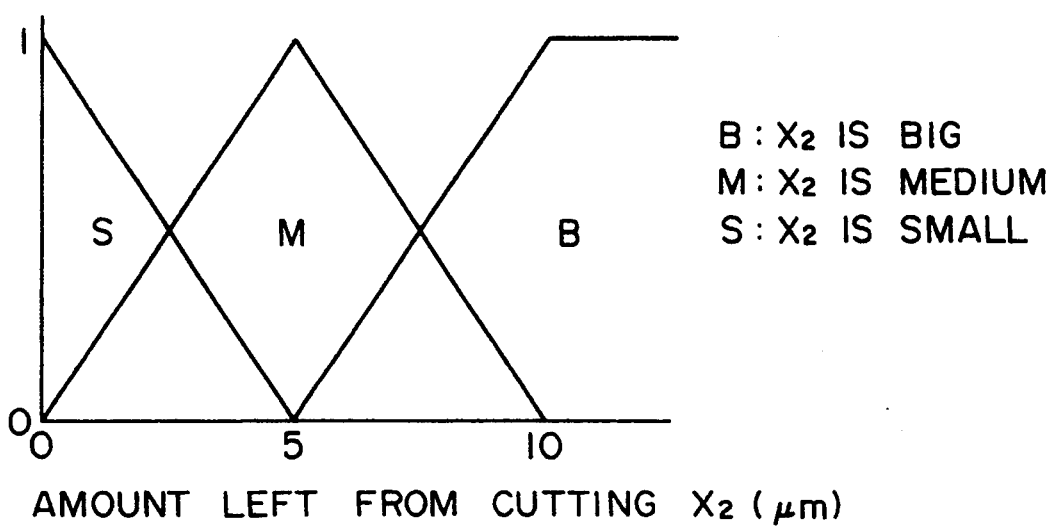
Figures 8, 9:
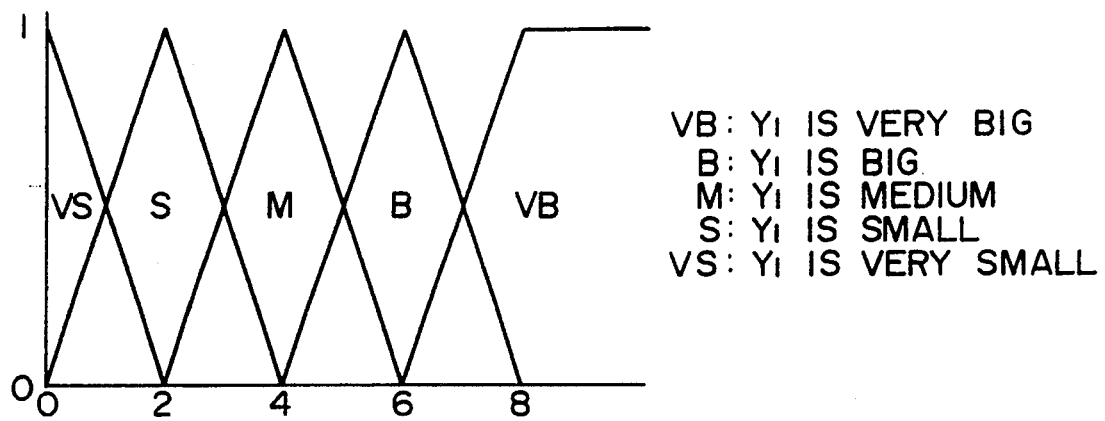

Basically, the reasoning is the same as shown in FIGS. 2 through 5. FIG. 6 shows an example of membership function in which the grindstone motor load $X_1$ from the motor load detector 9 is the input value. FIG. 7 shows an example of membership function in which the amount left from cutting $X_2$ obtained from the measured value from the workpiece dimension detector 7 and the set amount of infeed calculated from the NC unit 11 are the input values. FIG. 8 shows an example of membership function in which the infeed speed change point $Y_1$ from fine grinding to spark out (expressed by the difference from the finished dimension) is the output value. Part of the control rules used in this embodiment are (a) and (b) described below. The matrix of control rules is shown in FIG. 9.

(a) If the grindstone motor load $X_1$ is large (B) and the amount left from cutting $X_2$ is small (S), the infeed speed change point from fine grinding to spark out $Y_1$ is set to be very large (VB).

(b) If the grindstone motor load $X_1$ is small (S) and the amount left from cutting $X_2$ is large (B), the infeed speed change point from fine grinding to spark out $Y_1$ is set to be very small (VS).

The above-described member functions as shown in FIGS. 2 through 4 and 6 through 8 may be defined for each constant infeed speed which has already been determined as described in each above example or may be defined on the same table.

Figure 10:
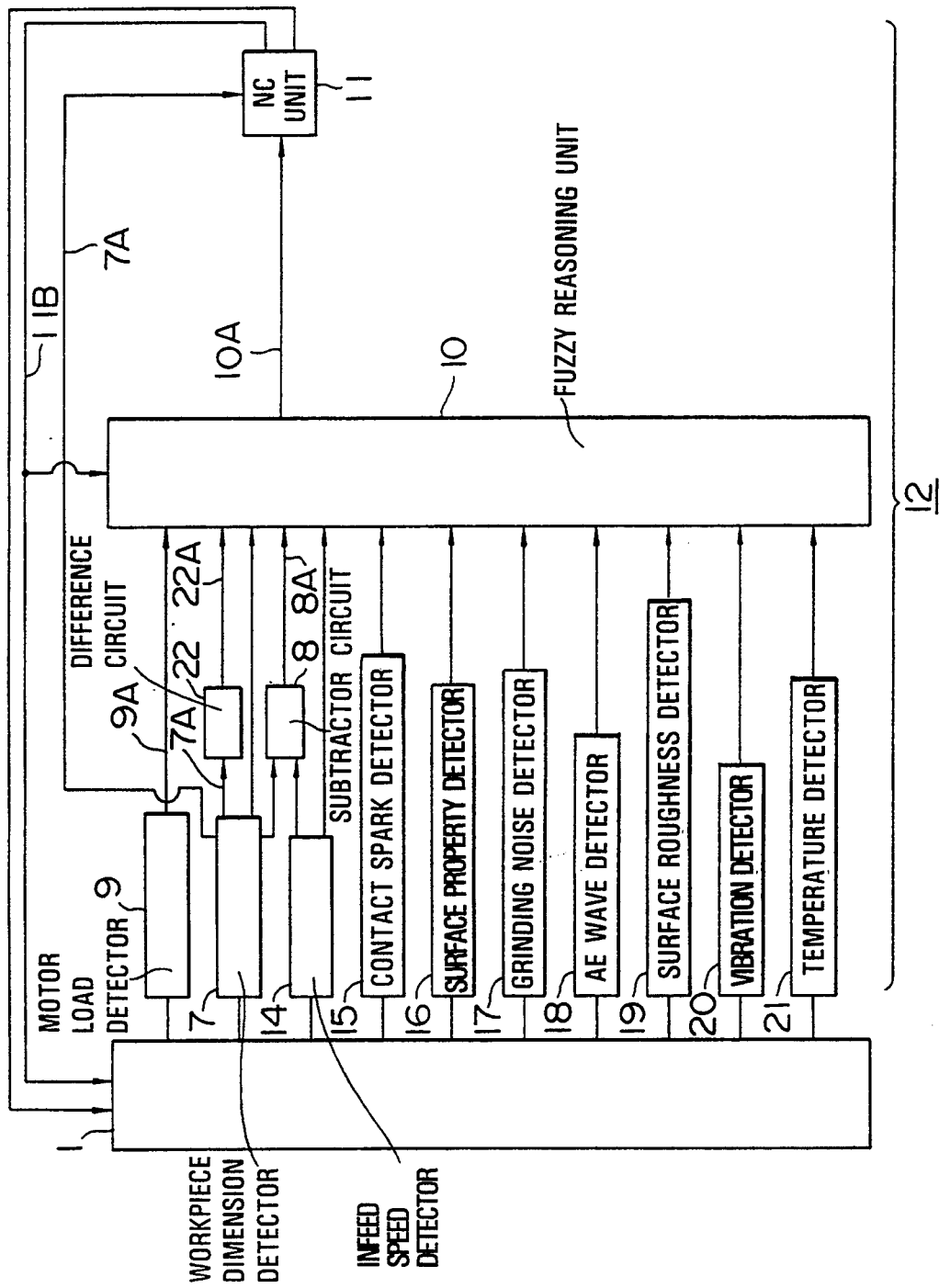
FIG. 10 is a block diagram showing the configuration of a second embodiment of this invention.

As the signal of input value to the fuzzy reasoning unit 10, not only two input values of the grindstone motor load and the amount left from cutting shown in FIG. 1, but also any values which represent the grinding conditions may be used. FIG. 10 shows one of the examples.

In a second embodiment of this invention shown in FIG. 10, the grinding machine body 1 has an infeed speed detector 14, a contact spark detector 15 between the grinding wheel 5 and the workpiece 6, a surface property (chatter mark) detector 16, a grinding noise detector 17, an AE wave detector 18, a surface roughness detector 19, a vibration detector 20, and a temperature detector 21, as well as the workpiece dimension detector 7 and the motor load detector 9. These values representing the grinding conditions detected by these detectors are input into the fuzzy reasoning unit 10. In this case, any number of the detected values and any combination of the detected values may be used for fuzzy reasoning. As an example, the second embodiment in which fuzzy reasoning for an optimum change point of the infeed speed is performed using the change of a workpiece dimension (for example, diameter) and the amount left from cutting as input values is described by referring FIGS. 10 through 14.

In FIG. 10, a difference circuit 22 determines the difference between the measured diameter from the workpiece dimension detector 7 and the diameter measured before a certain time, namely, the change in workpiece diameter (change with time), and feeds its signal 22A to the fuzzy reasoning unit 10. The subtractor circuit 8 determines the amount left from cutting from the measured diameter detected by the workpiece dimension detector 7 and the grindstone infeed based on the infeed speed detector 14, and feeds its signal 8A to the fuzzy reasoning unit 10.

Figure 11:
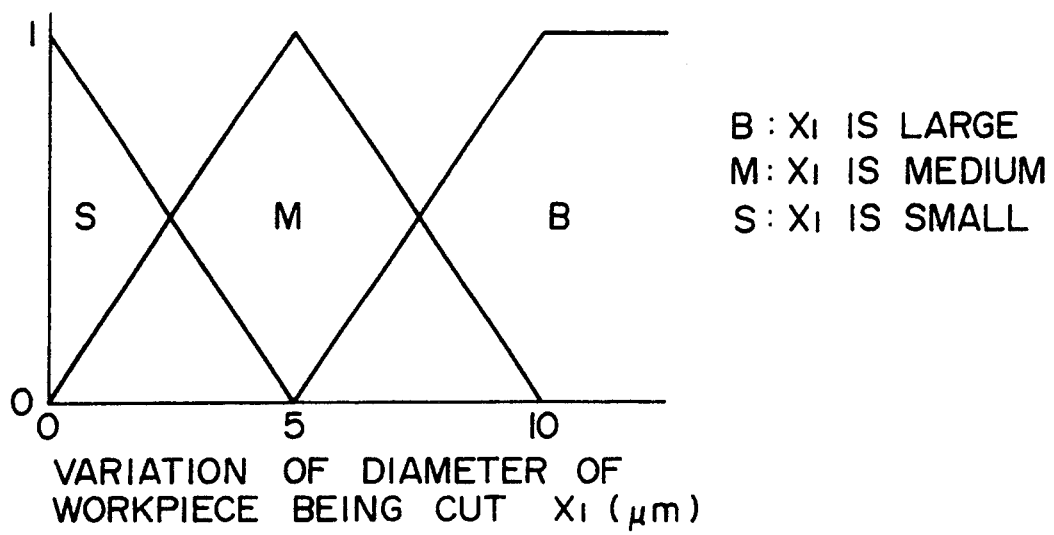
Figure 12:
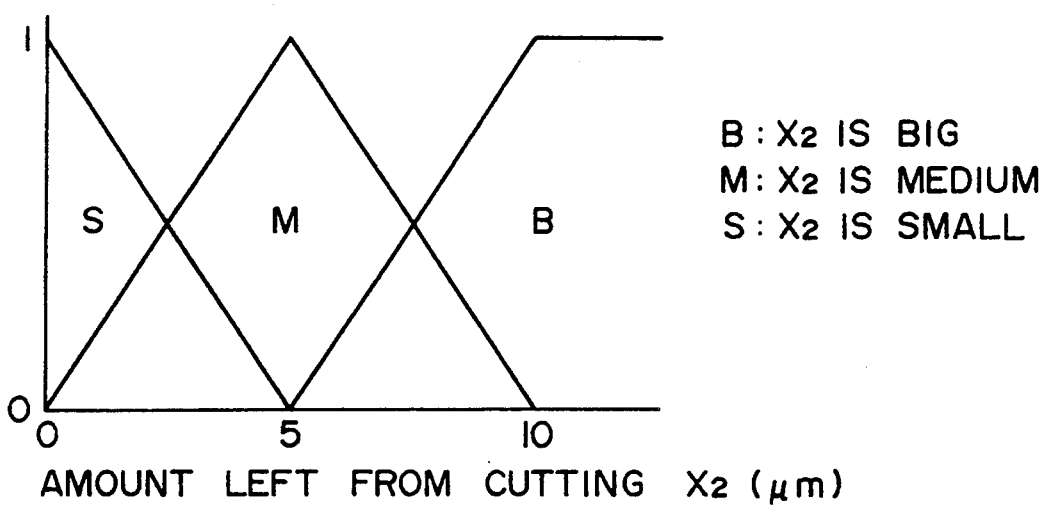
Figures 13, 14:
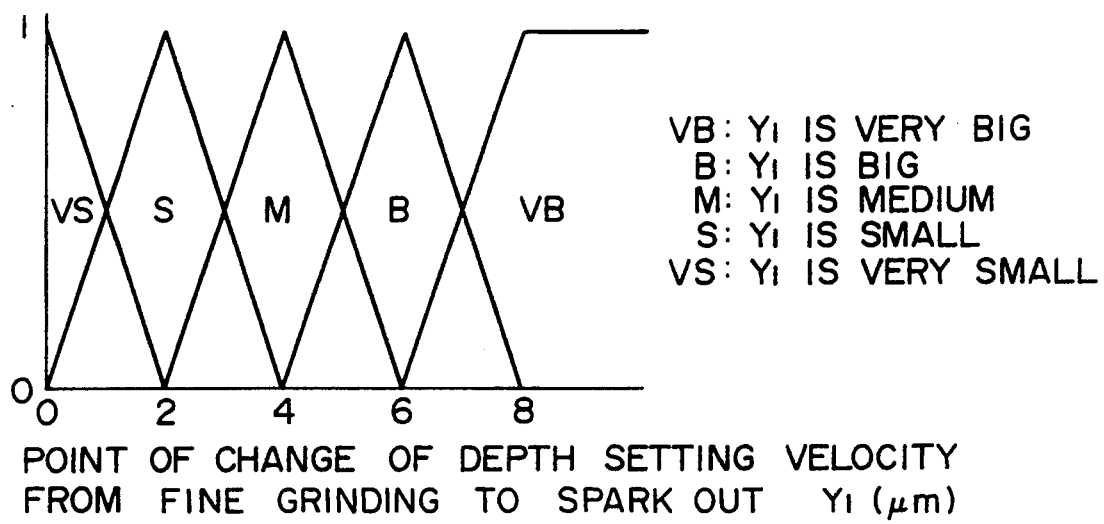

FIG. 11 shows an example of membership function in which the change in workpiece diameter $X_1$ obtained from the difference circuit 22 is the input value. FIG. 12 shows an example of membership function in which the amount left from cutting $X_2$ obtained from the subtractor circuit 8 is the input value. FIG. 13 shows an example of membership function in which the infeed speed change point from fine grinding to spark out $Y_1$ (expressed by the difference from the finished dimension) is the output value. Part of the control rules used in this embodiment are (a) and (b) described below. The matrix of control rules is shown in FIG. 14.

(a) If the change in workpiece diameter $X_1$ is large (B) and the amount left from cutting $X_2$ is small (S), the infeed speed change point from fine grinding to spark out $Y_1$ is set to be very large (VB).

(b) If the change in workpiece diameter $X_1$ is small (S) and the amount left from cutting $X_2$ is large (B), the infeed speed change point from fine grinding to spark out $Y_1$ is set to be very small (VS).

Any number of change points, as long as it is at least one, may be used for computation.

Factors other than the grindstone motor load, the amount left from cutting, and the change in workpiece dimension can be used as an input value signal as described below.

Infeed speed:

The infeed speed according to the instructions from NC unit 11 and the actual infeed speed of the grinding machine body 1 do not necessarily agree with each other; they differ depending on the grinding conditions. Therefore, precise control can be carried out by measuring the infeed speed with the infeed speed detector 14 and taking the measured value as an input value for the fuzzy reasoning.

Surface property:

When light falls on the workpiece 6, the reflected light may sometimes produce a striped pattern (chatter marks). If such chatter marks are generated, the commercial value of a product may decrease even if the requirements for dimensional accuracy and surface roughness are satisfied. Therefore, the surface property is detected by the surface property detector 16 and is taken as an input value into the fuzzy reasoning to control high-quality grinding operation.

Surface roughness:

The required surface roughness is specified for each product. Therefore, the current surface roughness of workpiece 6 is detected by the surface roughness detector 19 during grinding operation. When the surface roughness reaches the required value, the grinding wheel 5 is relatively drawn apart from the workpiece 6 to stop spark out. This allows the required accuracy to be attained in a short time without performing unnecessary spark out. If necessary, the detected value of surface roughness is taken as an input value into the fuzzy reasoning.

Vibration:

The vibration occurring during grinding operation depends on the rigidity of the grinding wheel 5 and the rigidity of the workpiece 6. The vibration causes chatter marks. Therefore, the vibration is detected by the vibration detector 20. This lets us know the grinding conditions. High-quality control can be carried out by taking the output value of the vibration detector 20 as an input value into the fuzzy reasoning.

Temperature:

The temperature of the workpiece 6 during grinding operation affects the quality of the workpiece 6, such as the surface hardness. The temperatures of the grinding fluid and the lubricating oil also affect the grinding conditions. Therefore, high-quality control can be carried out by taking the output value of the temperature detector 21 as an input value into the fuzzy reasoning.

AE wave:

If the AE wave during grinding operation is detected by the AE wave detector 18, the grinding conditions can be found even when the contact detection of grinding wheel 5 and workpiece 6 is difficult to do, for example, in the case of spark out. Therefore, high-quality control can be carried out by taking the detected value of AE wave as an input value into the fuzzy reasoning.

Grinding noise, spark:

Skilled workers judge the machinability of a workpiece 6 and the grindability of a grinding wheel comprehensively by hearing the grinding noise and observing the spark caused by the contact between the grinding wheel 5 and the workpiece 6. Therefore, the grinding conditions can be found by investigating the nature of the noise and the spark detected by the grinding noise detector 17 and the contact spark detector 15, respectively. High-quality control can be carried out by taking these detected values as input values into the fuzzy reasoning.

According to the above-described apparatus for achieving the first object of this invention, the change point of the constant infeed speed can be automatically controlled by the fuzzy reasoning on the basis of the detected values for grinding conditions. Therefore, it is unnecessary to closely model the grinding conditions, and the computation of change points can be performed in a short time, as compared with the adaptive control grinding. Moreover, the apparatus according to this invention can respond to minute changes of the grinding conditions, resulting in improvements in grinding accuracy, stabilized quality, and shortening of machining time.

The control method of spark out starting point of grinding machine of a third embodiment of this invention is described below.

In this third embodiment of this invention, the following operation is performed:

The dimension, such as the diameter or width, of workpiece is measured during grinding operation before spark out. Also, the difference of measured workpiece dimension and the infeed of grinding wheel is determined, and the first spark out starting point is determined from the predetermined control rule by fuzzy logic operation. In addition, assuming the spark out at the first spark out starting point, the difference between the workpiece dimension at the time of spark out end and that at the time one turn before the spark out end. Next, the second spark out starting point is determined from the first spark out starting point and the predetermined control rule by fuzzy logic operation. Then, spark out is performed at the second spark out starting point.

By reference to FIGS. 15 through 24, the third embodiment of this invention is described which is applied to plunge, traverse, or taper grinding.

Figure 15:
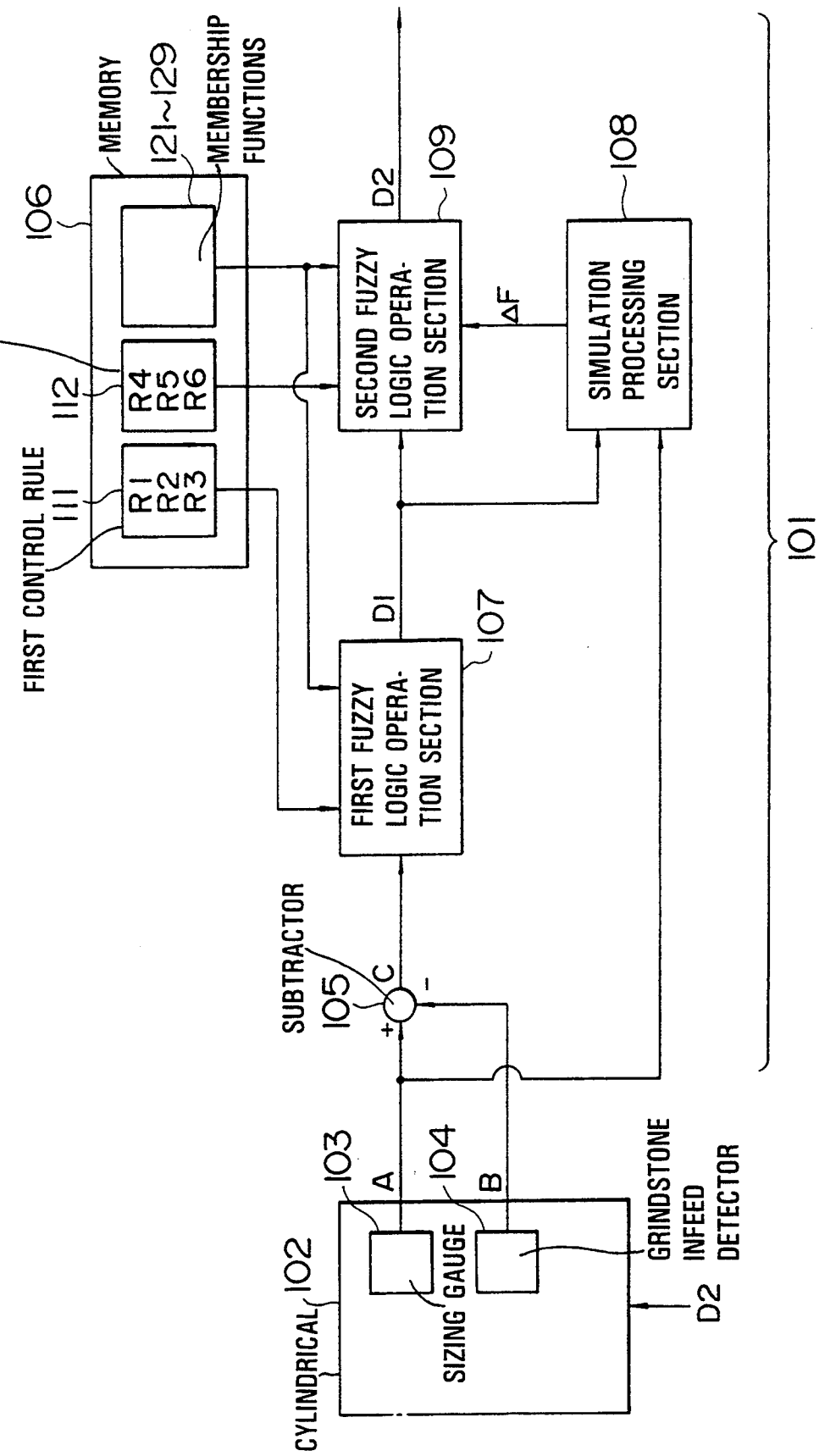
FIG. 15 is a block diagram showing the configuration of a third embodiment of this invention.

Referring to FIG. 15, the output signals of the sizing gage 103 and the grindstone infeed detector 104 on the cylindrical grinding machine body 102 are fed to the control unit 101, and spark out instructions are given to the cylindrical grinding machine body 102 by the control unit 101. The sizing gage 103 directly measures the diameter A of workpiece in an online mode. The infeed detector 104 measures the amount of infeed (diameter) B of the grinding wheel in an online mode.

The control unit 101 comprises a subtractor section 105, a memory 106 for storing the control rules and membership functions, a first fuzzy logic operation section 107, a simulation processing section 108, and a second fuzzy logic operation section 109.

The subtractor section 105 computes the difference A−B (A minus B) between the measured value A of workpiece diameter obtained from the sizing gage 103 and the infeed B of the grinding wheel obtained from the detector 104. This difference A−B is the amount left from cutting C of the workpiece (C=A−B).

A part of memory 106 stores R1-R3 as a first control rule 111.

R1: If the amount left from cutting is "large", the spark out starting point is made small.
R2: If the amount left from cutting is "medium", the spark out starting point is made unchanged.
R3: If the amount left from cutting is "small", the spark out starting point is made large.

Also, a part of memory 106 stores R4-R6 as a second control rule 112.
R4: If the finished diameter seems to be reached smoothly by making large the spark out starting point, the spark out starting point is made large.
R5: If the finished diameter seems to be reached smoothly by making small the spark out starting point, the spark out starting point is made small.
R6: If, without changing the spark out starting point, the finished diameter seems to be reached smoothly, the spark out starting change point remains unchanged.

Figure 16:
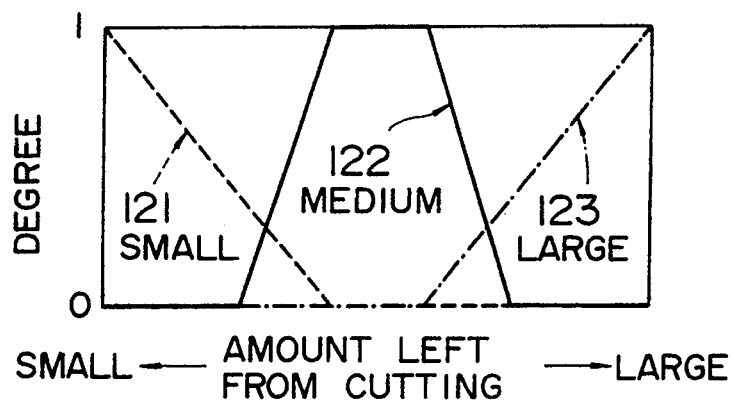
FIGS. 16 through 18 are diagrams showing membership functions.
Figure 17:
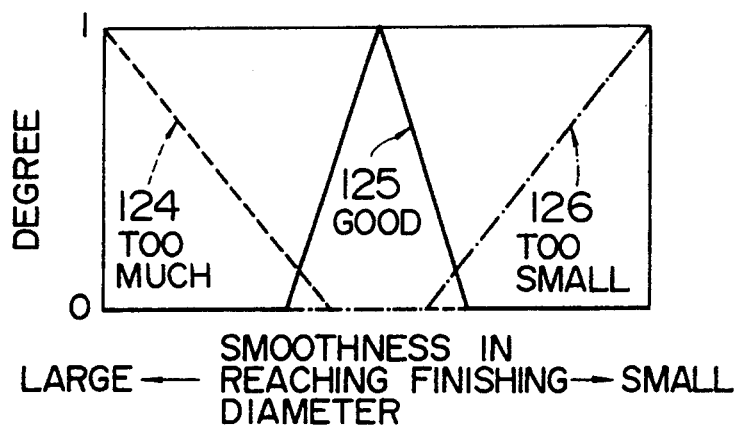
Figure 18:
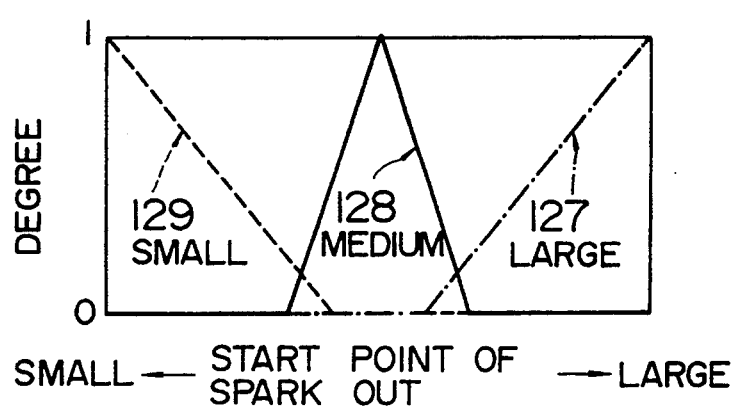

A part of the memory 106 also stores the membership functions 121 through 129 shown in FIGS. 16 through 18.

The first logic operation section 107 inputs the amount left from cutting C computed by the subtractor 105, and determines the first spark out starting point D1 on the basis of the first control rule 111 of R1-R3 and the membership functions 121 through 123 and 127 through 129. The membership function 121 represents a degree in which the amount left from cutting fits into the description of "small", the membership function 122 represents a degree in which the amount left from cutting fits into the description of "medium", and the membership function 123 represents a degree in which the amount left from cutting fits into the description of "large". The membership 127 represents a degree in which the spark out starting point fits into the description of "large", the membership function 128 represents a degree in which the spark out starting point fits into the description of "medium", and the membership function 129 represents a degree in which the spark out starting point fits into the description of "small".

Figure 19C:
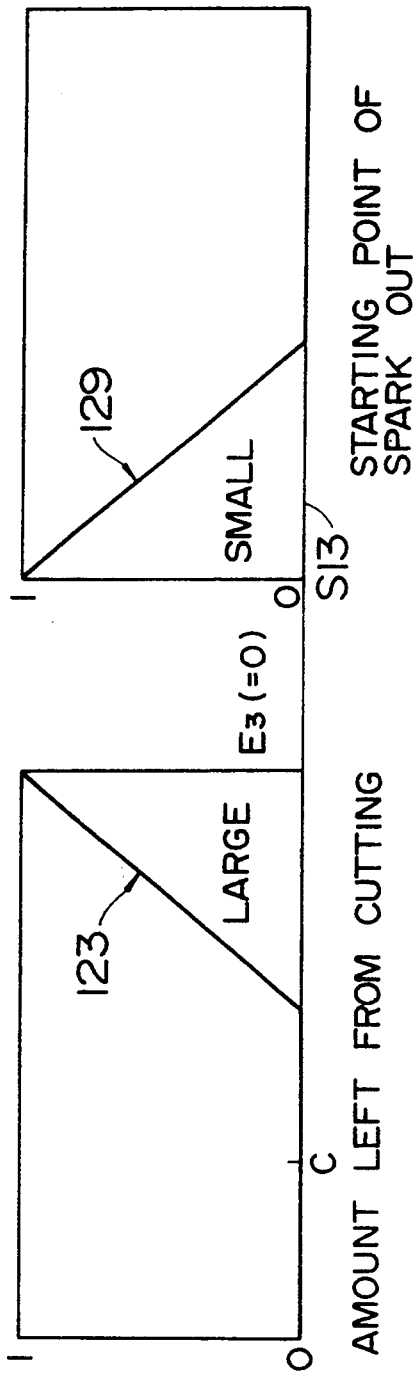
Figure 19D:
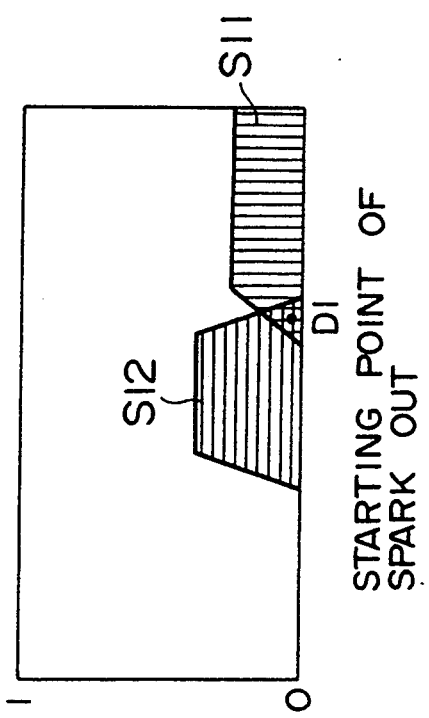

By reference to FIGS. 19(a) through 19(d), the first working example for determining the spark out starting point D1 is described. If the amount left from cutting is C at a certain time, the degree of fitting into the description, "small amount left from cutting", is found to be E1 from the membership function 121 as shown in FIG. 19(a) according to the control rule R3, and a region S11 below the degree E1 is determined from the membership function 127. Also, the degree of fitting into "medium amount left from cutting" is found to be E2 from the membership 122 as shown in FIG. 19(b) according to the control rule R2, and a region S12 below the degree E2 is determined from the membership function 128. Furthermore, the degree of fitting into "large amount left from cutting" is found to be E3 from the membership function 123 as shown in FIG. 19(c) according to the control rule R1, and a region S13 below the degree E3 is determined from the membership function 129. However, E3=0 and S13=0. Then, the center of gravity D1 of three regions S11 through S13 is determined as shown in FIG. 19(d). This center of gravity is fed to the simulation processing section 108 as the first spark out starting point.

Figure 20:
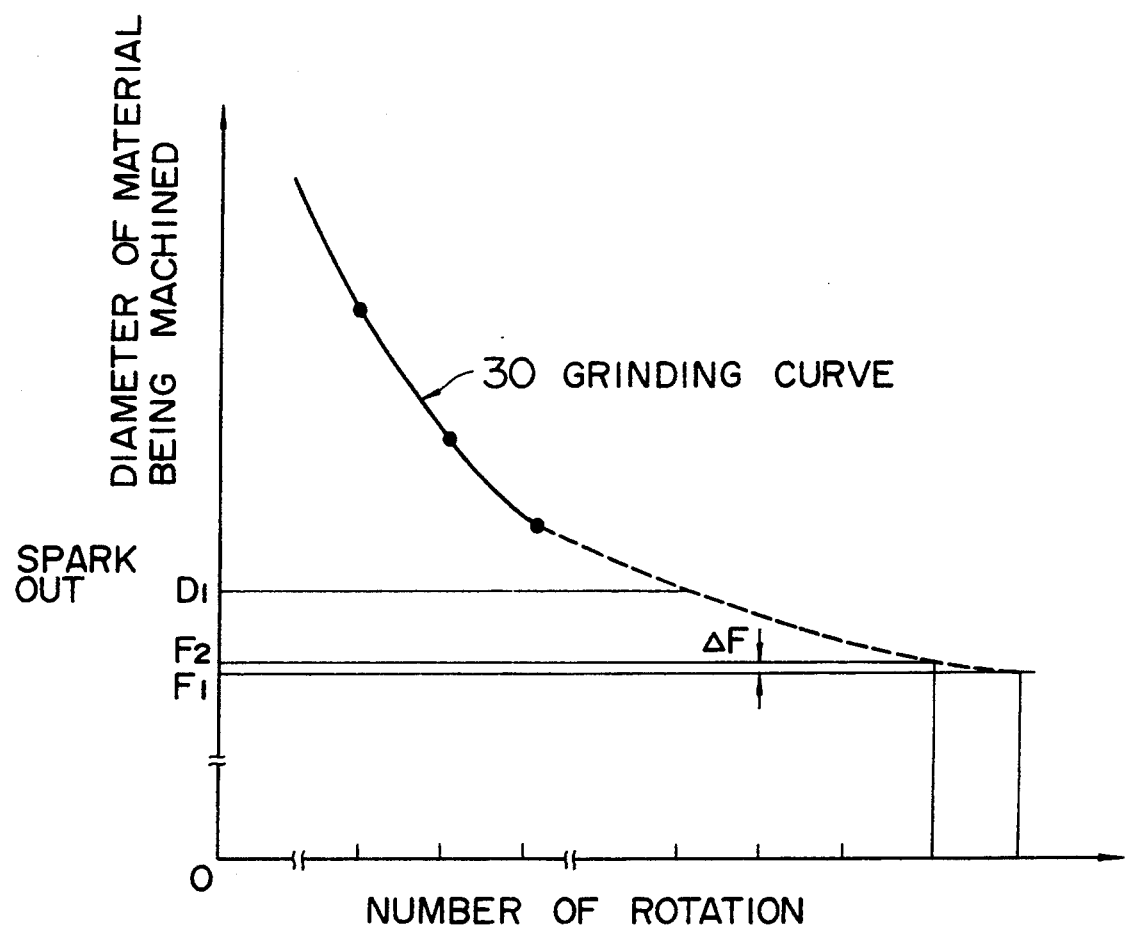
FIG. 20 is a diagram for explaining the simulation process.
Figure 21C:
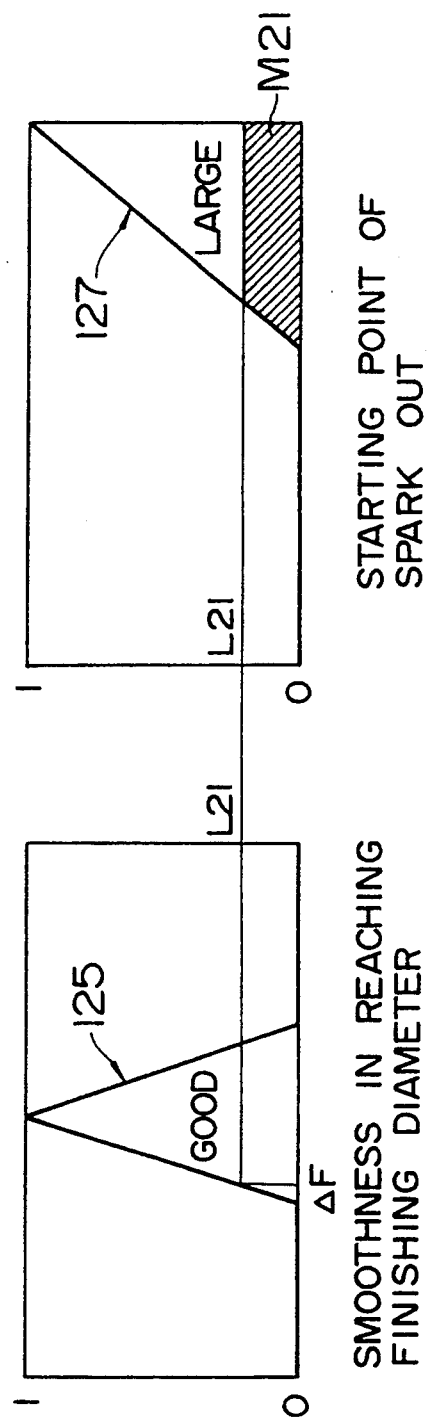

The simulation processing section 108 estimates a grinding curve 130 as shown in FIG. 20, assuming that spark out takes place at D1, from the past trend of the measured value A of the workpiece diameter obtained from the sizing gage 103 and the first spark out starting point D1. From the grinding curve 130, the simulation processing section 108 determines the workpiece diameter F1 at the time when the spark out ends and the workpiece diameter F2 at the time of one turn before the spark out ends, and computes the difference ΔF=F2−F1, which is fed to the second fuzzy logic operation section 109. This difference Δ F of workpiece diameters represents the smoothness in reaching the finishing diameter.

The second fuzzy logic operation section 109, receiving the smoothness ΔF in reaching the finished diameter and the first spark out starting point D1, computes the second spark out starting point D2 on the basis of the control rules of R4-R6 and the membership functions 124-129, and gives it to the cylindrical grinding body 102 as an instruction for starting spark out. The membership function 124 represents a degree in which the smoothness in reaching the finished diameter fits into the description of "too much". The membership function 125 represents a degree in which the smoothness in reaching the finished diameter fits into the description of "good". The membership function 126 represents a degree in which the smoothness in reaching the finished diameter fits into the description of "too small".

By reference to FIGS. 21 through 24, a second working example for determining the spark out starting point D2 is described. Referring to FIGS. 21(a) through 21(e), a degree H21 in which the first spark out starting point D1 fits "large spark out starting point" is determined from the membership function 127 in accordance with the control rule R4 as shown in FIG. 21(a). As shown in FIG. 21(b), a degree J21 in which the smoothness in reaching the finished dimension $\Delta F$ fits into the description of "too much" is determined from the membership function 124, and a region K21 below J21 is determined from the membership function 127. As shown in FIG. 21(c), a degree L21 in which $\Delta F$ fits into the description of "good" is determined from the membership function 125, and a region M21 below L21 is determined from the membership function 127. Similarly, as shown in FIG. 21(d), a degree N21 in which $\Delta F$ fits into the description of "too small" is determined from the membership function 126, and a region P21 below N21 is determined from the membership function 127. Next, as shown in FIG. 21(e), the center of gravity G21 of three regions K21, M21 and P21 is determined. The degree Q21 of membership function 127 at center of gravity G21 is determined, and the product R21 of Q21 and H21 is computed.

Referring to FIGS. 22(a) through 22(e), a degree H22 in which the first spark out starting point D1 fits into a description, "medium spark out starting point", is determined from the membership function 128 in accordance with the control rule R5 as shown in FIG. 22(a). As shown in FIG. 22(b), a degree J22 in which the smoothness in reaching finished dimension $\Delta F$ fits into "too large" is determined from the membership function 124, and a region K22 below J22 is determined from the membership function 128. As shown in FIG. 22(c), a degree L22 in which $\Delta F$ fits into "good" is determined from the membership function 125, and a region M22 below L22 is determined from the membership function 128. Similarly, as shown in FIG. 22(d), a degree N22 in which $\Delta F$ fits into "too small" is determined from the membership function 126, and a region P22 below N22 is determined from the membership function 128. Next, as shown in FIG. 22(e), the center of gravity G22 of three regions K22, M22 and P22 is determined. The degree Q22 of the membership function 128 at center of gravity G22 is determined, and the product R22 of Q22 and H22 is computed.

Figure 23C:
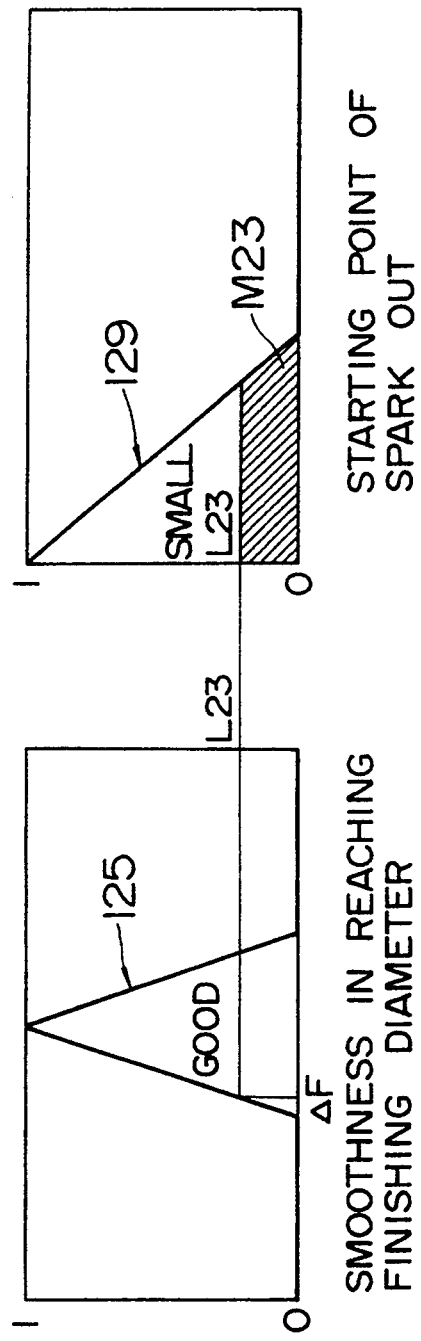

Referring to FIG. 23(a) through 23(e), a degree H23 in which the first spark out starting point D1 fits into "small spark out starting point" is determined from the membership function 129 in accordance with the control rule R6 as shown in FIG. 23(a). As shown in FIG. 23(b), a degree J23 in which the smoothness in reaching finished dimension $\Delta F$ fits into "too large" is determined from the membership function 124, and a region K23 below J23 is determined from the membership function 129. As shown in FIG. 23(c), a degree L23 in which $\Delta F$ fits into "good" is determined from the membership function 125, and a region M23 below L23 is determined from the membership function 129. Similarly, as shown in FIG. 23(d), a degree N23 in which $\Delta F$ fits into "too small" is determined from the membership function 126, and a region P23 below N23 is determined from the membership function 129. Next, as shown in FIG. 23(e), the center of gravity G23 of three regions K23, M23 and P23 is determined. The degree Q23 of the membership function 129 at the center of gravity G23 is determined, and the product R23 of Q23 and H23 is computed.

Figure 24C:
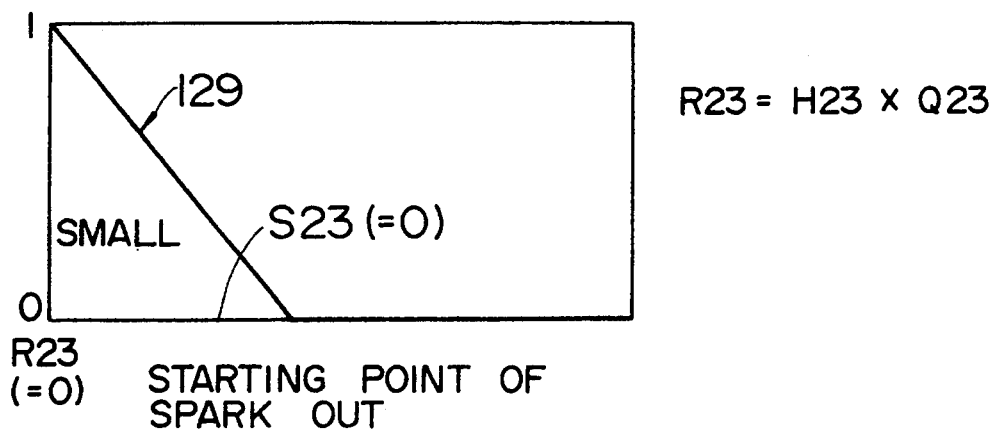
Figure 24D:
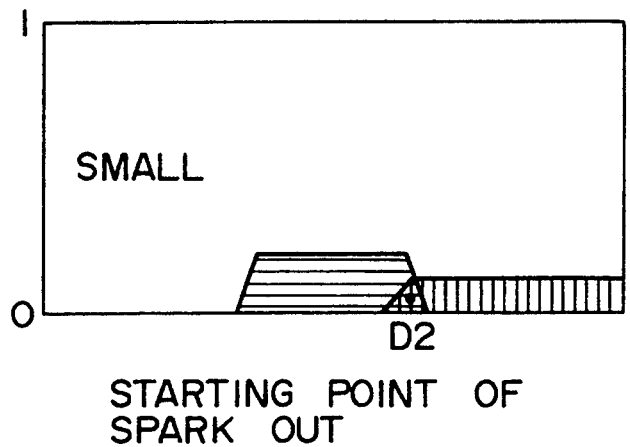

Referring to FIG. 24(a) through 24(e), a region S21 below the degree R21 (=H21×Q21) at the membership function 127 is determined as shown in FIG. 24(a). A region S22 below the degree R22 (=H22×Q22) at the membership function 128 is determined as shown in FIG. 24(b). A region below the degree R23 (=H23×Q23) at the membership function 129 is determined as shown in FIG. 24(c). The center of gravity D2 of three regions S21 through S23 is computed, and it is taken as the second spark out starting point.

In the above-described third embodiment, the control of spark out starting points in plunge, traverse, or taper grinding has been described, but the control method in shoulder grinding is the same as the above. In the shoulder grinding, instead of the diameter, the width of a workpiece is measured by the sizing gage in an online mode, and the infeed (width) of the grinding wheel is measured by the infeed detector in an online mode. The difference between the measured value of the workpiece width and the amount of infeed of the grinding wheel is taken as the amount left from cutting; from the amount left from cutting, the first spark out starting point is determined. Then, a grinding curve is estimated by simulation. From this grinding curve, the difference between the workpiece width at the time when the spark out ends and that at the time of one turn before the spark out ends is determined. By using this difference as the "smoothness in reaching the finished width" instead of the "smoothness in reaching the finished diameter" in the above-described second embodiment, the second spark out starting point can be determined.

In the above-described third embodiment, the first spark out starting point is determined by using the difference between the diameter or width of the workpiece and the amount of infeed of the grinding wheel (the amount left from cutting) as the input values for the fuzzy reasoning, and the second spark out starting point is determined by using the smoothness in reaching the finished dimension as an input value into the fuzzy reasoning. However, any factor or factors may be used in place of or in addition to these input values, if such factors represent the grinding conditions. They include the difference between the NC command value and the measured value of the infeed speed, the surface property (chatter marks), the surface roughness, the vibration, the AE wave, the grinding noise, the grinding spark, the temperature of the workpiece, the temperature of the grinding fluid, and the temperature of the lubricating oil.

According to the above-described method for achieving the second object of this invention, the spark out starting point can be controlled for each workpiece by fuzzy logic operation, resulting in improvements in grinding accuracy, stabilized quality, and shortening of machining time.

By reference to FIGS. 25 through 30, a fourth embodiment of this invention, an apparatus for judging the necessity of changing coolant, is described.

FIG. 25 shows a configuration of one embodiment of this invention applied to an NC grinding machine. In this configuration, a detector 211 of impurities contained in a grinding fluid and a surface roughness detector 212 are used as sensors, so that the necessity of changing coolant can be automatically judged by the fuzzy reasoning as shown in FIGS. 26 through 30 using the chip content and the surface roughness as input values for a fuzzy reasoning unit 210.

Referring to FIG. 25, a workpiece 202 is held by a headstock (not shown) or both a headstock and a tail stock (not shown) and rotated on a grinding machine body 201. A grinding wheel 203 is also rotated by a driving motor 204. The grinding wheel 203 and the workpiece 202 are moved relatively by a moving means (not shown), and the infeed is controlled under the control of an NC unit 205.

The grinding machine body 201 has a grinding fluid service tank 207 for supplying grinding fluid 206 to the machining point and a grinding fluid cleaning means 208 for recovering the grinding fluid, cleaning it, and return it to the grinding fluid service tank 207, by which the grinding fluid is supplied to the machining point in a circulating mode. Reference numeral 209 denotes a reservoir for fresh grinding fluid.

The detector 211 of impurities contained in the grinding fluid, being installed in the grinding fluid circulation system, detects the chip content in the cleaned grinding fluid optically, electrically, or by other means. The surface roughness detector 212 detects the surface roughness of the workpiece. These detectors 211, 212 may perform detection invariably during grinding operation or may do after grinding operation.

The fuzzy reasoning unit 210 determines the necessity of changing the grinding fluid during or after grinding operation on the basis of the input values fed by these two detectors 211, 212 (chip content and surface roughness). Then, this unit gives the result to the NC unit 205, which supplies the execution command signal 205A for changing fluid to the grinding machine body 201.

Next, the fuzzy reasoning unit 210 is described in detail. Here, it is assumed that 2-input 1-output fuzzy reasoning is performed. The unit carries out the operations for judging the necessity of changing grinding fluid on the basis of the membership functions shown in FIGS. 26 through 28.

Figure 26:
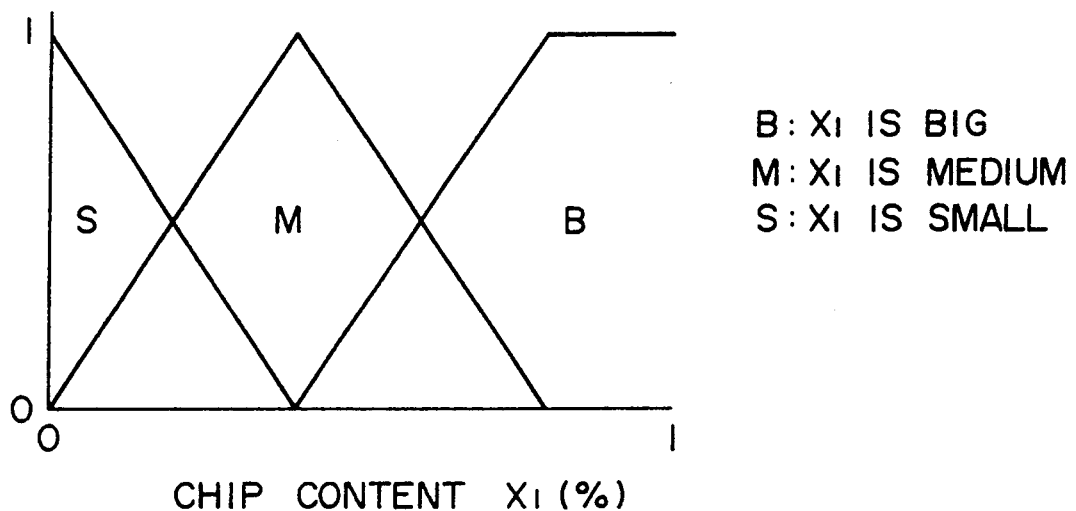
FIGS. 26 through 28 are diagrams showing membership functions.
Figure 27:
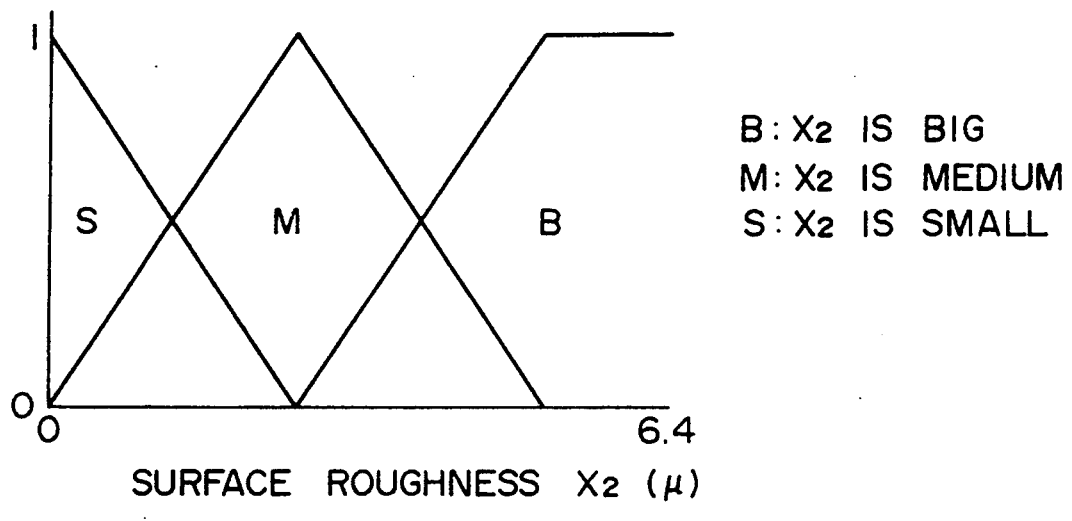
Figures 28, 29:
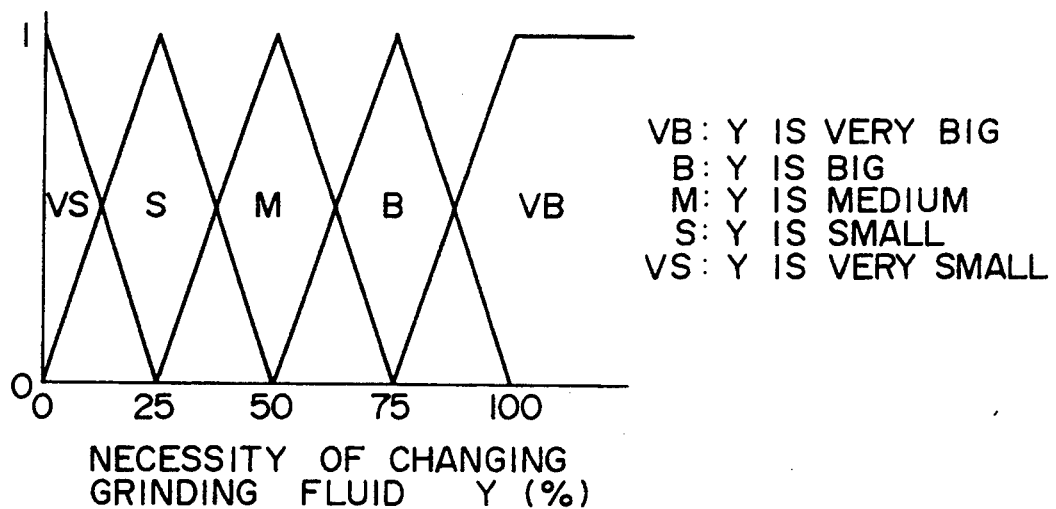
FIG. 29 is a diagram showing a matrix of control rules.

FIG. 26 shows an example of the membership function which uses the chip content (represented as %) $X_1$ detected by the detector 211 for impurities contained in the grinding fluid as an input value. FIG. 27 shows an example of the membership function which uses the surface roughness $X_2$ detected by the surface roughness detector 212 as an input value. FIG. 28 shows an example of the membership function which uses the necessity of changing the grinding fluid (represented as %) Y as an output value. Part of the control rules used in this fourth embodiment are (a) and (b) shown below. FIG. 29 shows the matrix of control rules.

(a) If the chip content $X_1$ is large (B) and the surface roughness $X_2$ is large (B), the necessity of changing the grinding fluid Y is set to be very large (VB).

(b) If the chip content $X_1$ is small (S) and the surface roughness $X_2$ is small (S), the necessity of changing the grinding fluid Y is set to be very small (VS).

The NC unit 205 receives the operation result 210A of the fuzzy reasoning unit 210, and compares the necessity Y of changing the grinding fluid with a predetermined reference value. When Y is larger than the reference value, the NC unit sends an execution command signal 205A to the grinding machine body 201, and outputs an alarm display 205B. After receiving the execution command signal 205A, the grinding machine body 201 automatically discharges the grinding fluid from the grinding fluid circulation system, and receives fresh grinding fluid from the reservoir 209.

Although the NC unit 205 compares the necessity Y of changing grinding fluid with the reference value in the above-described fourth embodiment, the fuzzy reasoning unit 210 may also make this comparison. In this case, the NC unit 205 receives the comparison result and sends the execution command signal 205A. The alarm display may be outputted by the fuzzy reasoning unit 210.

As input values to the fuzzy reasoning unit 210, not only two input values for the chip content and the surface roughness shown in FIG. 25, but also any factors which represent the conditions of the grinding fluid or the workpiece may be used. As an example of such case, FIG. 30 shows a fifth embodiment of this invention.

Figure 30:
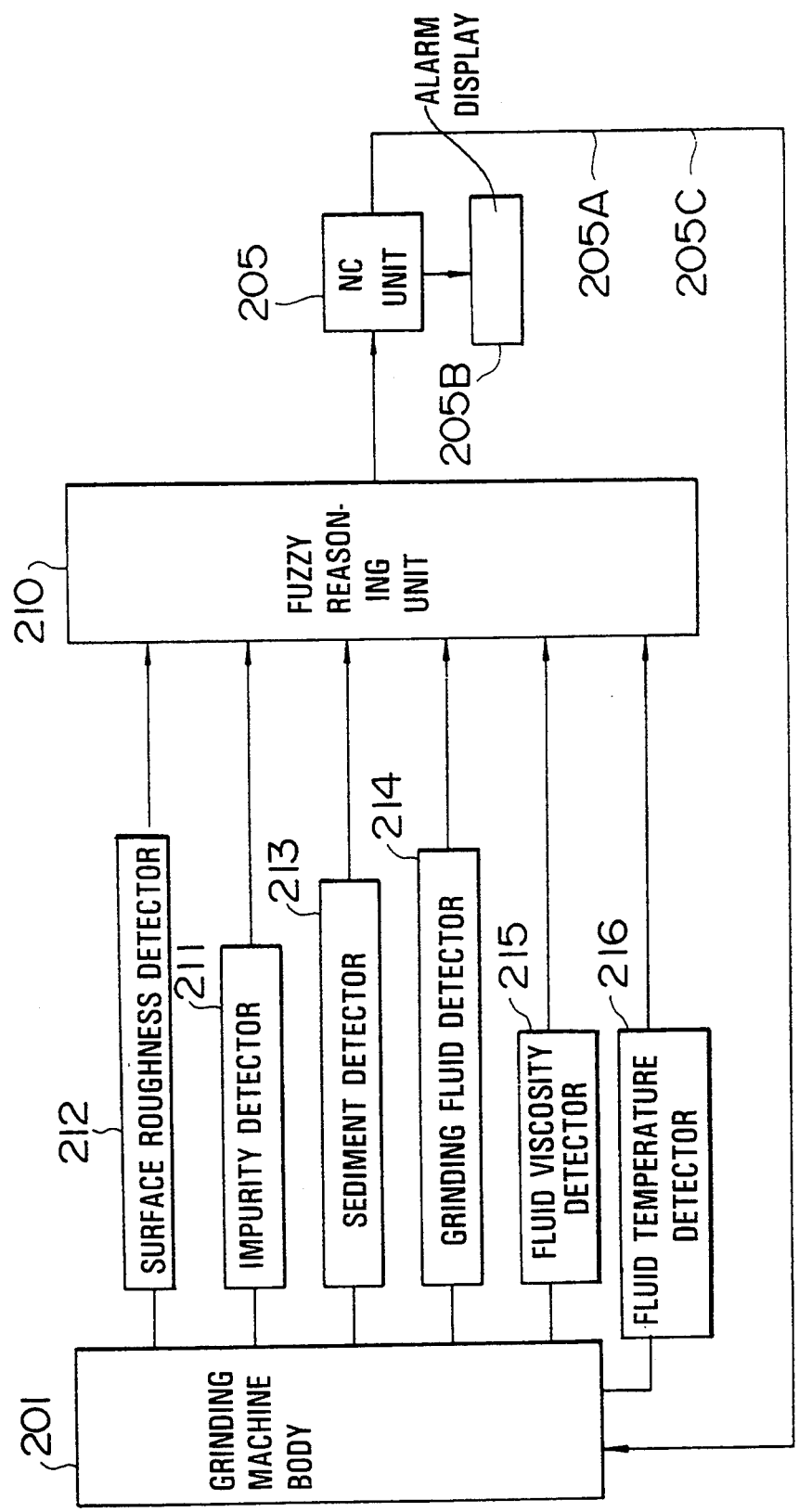
FIG. 30 is a block diagram showing the configuration of a fifth embodiment of this invention.

In the embodiment shown in FIG. 30, a grinding machine body 201 has a detector 213 for sediment in a grinding fluid service tank, a detector 214 for the amount of the grinding fluid in a service tank, a fluid viscosity detector 215, and a fluid temperature detector 216, as well as the detector 211 for impurities present in the grinding fluid and the surface roughness detector 212. Measured values obtained from these detectors are fed to the fuzzy reasoning unit 210. In this case, any number of any detected values may be used, or any combination of the detected values may be used for fuzzy reasoning.

As an example, fuzzy reasoning may be performed according to the following rule: "If the sediment in the grinding fluid service tank 207 is 'large', the necessity of changing the grinding fluid is large. If the sediment is 'medium', the necessity is medium. If the sediment is 'small', the necessity is small."

Also, fuzzy reasoning may be performed by the following rule: "If the amount of the grinding fluid in the service tank 207 is 'large', the necessity of changing the grinding fluid is small. If the amount of the fluid is 'medium', the necessity is medium. If the amount of the fluid is 'small', the necessity is large." or "If the viscosity of the grinding fluid is 'high', the necessity of changing the grinding fluid is large. If the viscosity is 'medium', the necessity is medium. If the viscosity is 'low', the necessity is small", or "If the temperature of the grinding fluid is 'high', the necessity of changing the grinding fluid is large. If the temperature is 'medium', the necessity medium. If the temperature is 'low', the necessity small."

For the judgment on the necessity of replenishing the grinding fluid, like the judgment on the necessity of changing the grinding fluid, the fuzzy reasoning unit 210 performs operations, and the operation result is compared with a predetermined reference value in the NC unit 205 or the fuzzy reasoning unit 210. When the result is larger than the reference value, an execution command signal 205C for replenishing the grinding fluid is sent to the grinding machine body 201 and the alarm display 205B is outputted. The grinding machine body 201, on receiving this command, automatically replenishes water or the grinding fluid from the reservoir 209.

Although the above-described fourth and fifth embodiments apply to grinding machines, this invention can be applied to other various machine tools.

According to the above-described apparatus for achieving the third object of this invention and the method of operating thereof, the necessity of changing or replenishing grinding fluid can be automatically judged by applying fuzzy reasoning. This enables automatic change and replenishment of the grinding fluid, contributing to the realization of an unmanned factory.

Next, a sixth embodiment of this invention is explained by reference to FIGS. 31 through 36.

Figure 31:
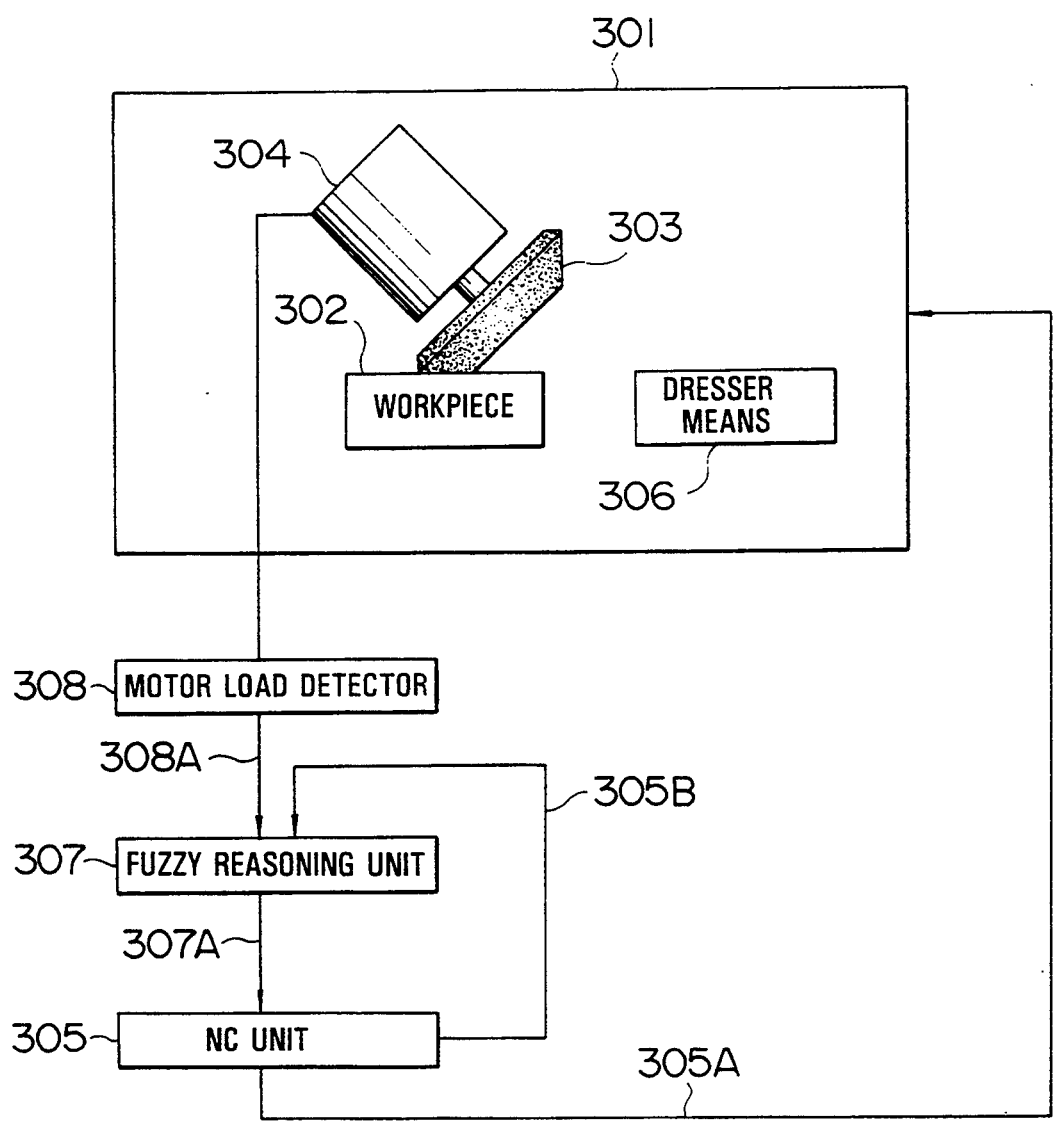
FIG. 31 is a block diagram showing the configuration of a sixth embodiment of this invention.

FIG. 31 shows the configuration of the sixth embodiment of this invention applied to an NC grinding machine. In this configuration, a motor load detector 308 is used as a sensor, and an NC unit 305 functions to calculate the number of ground pieces. The necessity of dressing is automatically judged by performing fuzzy reasoning as shown in FIGS. 32 through 35 with the motor load and the number of ground pieces being used as input values into the fuzzy reasoning unit 307.

Referring to FIG. 31, a workpiece 302 is held by a headstock (not shown) or by both of a headstock and a tail stock (not shown), and rotated on a grinding machine body 301. A grinding wheel 303 is also rotated by a driving motor 304. The grinding wheel 303 and the workpiece 302 are moved relatively by a moving means (not shown), and the amount of infeed is controlled by the NC unit 305. In addition, the grinding machine body 301 has a dresser means 306 for performing dressing and truing of grinding wheels. By moving at least either the grinding wheel 303 or the dressing means 306 by a moving mechanism (not shown), dressing or truing can be performed. Dressing or truing is performed by a command 305A of the NC unit 305. The motor load detector 308 detects the motor load during grinding operation by measuring the load current of motor 304 during grinding operation, and feeds the detection signal 308A to the fuzzy reasoning unit 307. The motor whose load is detected may be not only the motor 304 for driving the grinding wheel but also the motor for rotating the workpiece 302.

The NC unit 305 counts the number of ground pieces as a sensor, and feeds the count value (dress interval) 305B to the fuzzy reasoning unit 307.

The fuzzy reasoning unit 307 performs operations for judging the necessity of dressing or truing during grinding operation on the basis of the inputted values from the motor load detector 308 and the NC unit 305 (the grindstone motor load and the number of ground pieces), and gives the result 307A to the NC unit 305. Then, the NC unit 305 sends an execution command signal 305A for dressing or truing to the grinding machine body 301.

Next, the fuzzy reasoning unit 307 is described in detail. Here, it is assumed that 2-input 1-output fuzzy reasoning is performed. The unit carries out the operations for judging the necessity of dressing on the basis of the membership functions shown in FIGS. 32 through 34.

Figure 32:
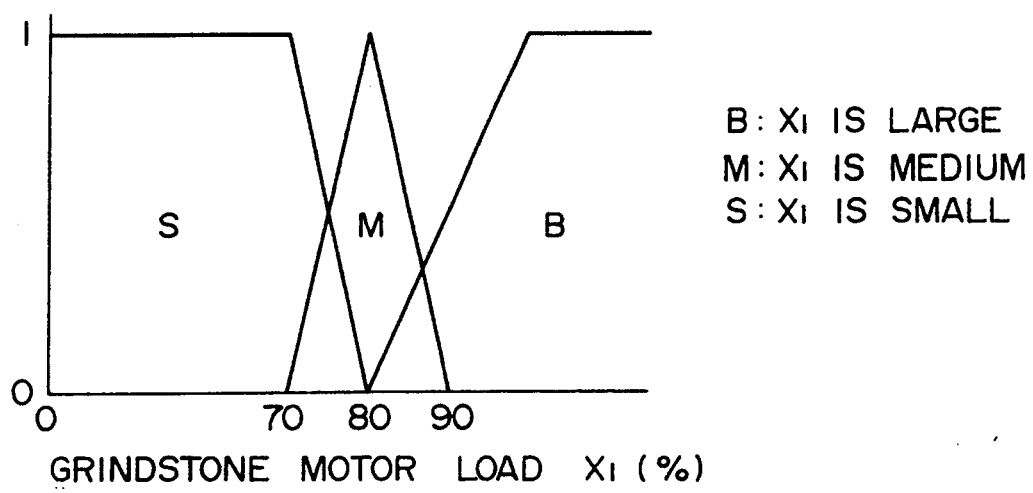
FIG. 32 through 34 are diagram showing membership functions.
Figure 33:
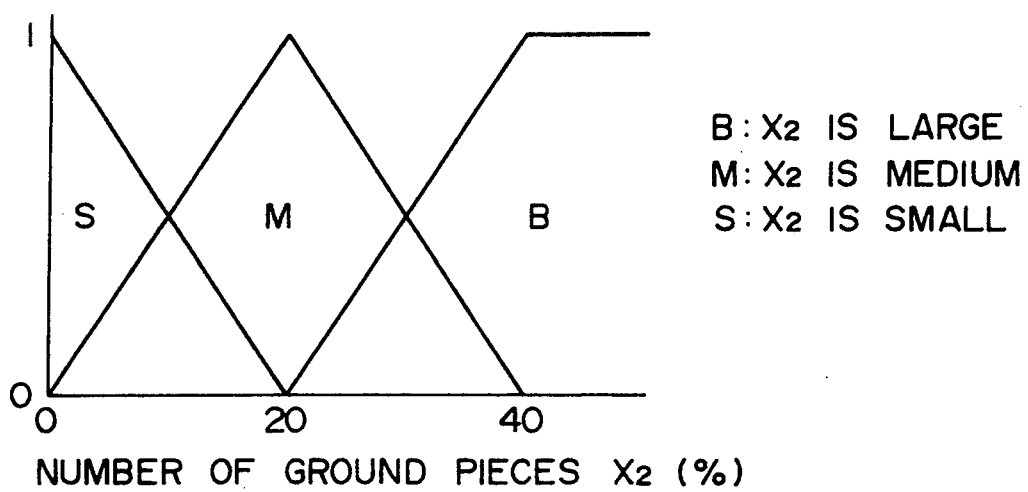
Figures 34, 35:
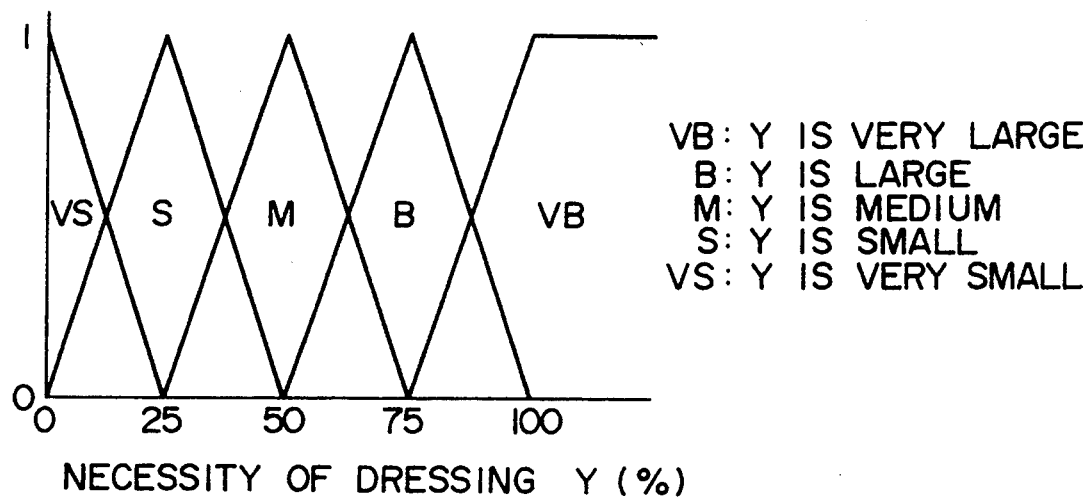
FIG. 35 is a diagram showing a matrix of control rules.

FIG. 32 shows an example of a membership function which uses the grindstone motor load $X_1$ (represented in %) detected by the motor load detector 308 as an input value. FIG. 33 shows an example of a membership function which uses the number of ground pieces (represented in % with respect to a standard number) $X_2$ obtained from the NC unit 305 as an input value. FIG. 34 shows an example of a membership function which uses the necessity Y of dressing (represented in %) as an output value. Part of the control rules used in this embodiment are (a) and (b) shown below. FIG. 35 shows the matrix of the control rules.

(a) If the grindstone motor load $X_1$ is large (B) and the number of ground pieces $X_2$ is large (B), the necessity of dressing Y is set to be very large (VB).

(b) If the grindstone motor load $X_1$ is small (S) and the number of ground pieces $X_2$ is small (S), the necessity of dressing Y is set to be very small (VS).

The NC unit 305 receives the operation result 307A from the fuzzy reasoning unit 307, and compares the necessity Y of dressing with a predetermined reference value. When the necessity Y of dressing is larger than the reference value, the NC unit automatically activates the dressing cycle and sends an execution command signal 305A to the grinding machine body 301. On receiving the execution command signal 305A, the dresser means 306 automatically comes close to the grinding wheel 303 on the grinding machine body 301 so that dressing is performed.

Although the NC unit 305 compares the necessity Y of dressing with the reference value in this embodiment, the fuzzy reasoning unit 307 may make this comparison. In this case, the NC unit 305 receives the comparison result and sends the execution command signal 305A.

As input signal values to the fuzzy reasoning unit 307, not only two input values of the grindstone motor load and the number of ground pieces shown in FIG. 31, but also any factors which represent the conditions of the grinding fluid or the workpiece may be used. As an example of such case, FIG. 36 shows a seventh embodiment of this invention.

In the embodiment shown in FIG. 36, the grinding machine body 301 has a surface roughness detector 309, a detector 310 of the number of ground pieces, and a grindstone wear detector 311 as well as the motor load detector 308. The values detected by these detectors are fed to the fuzzy reasoning unit 307. The detector 310 of the number of ground pieces measures the number of workpieces 302 which have been ground, in place of the computation by the NC unit 305. The grindstone wear detector 311 detects the amount of wear by measuring the outside diameter of the grinding wheel 303. Although the fuzzy reasoning unit 307 normally carries out the operations during grinding, it may do so after grinding when a detector which cannot perform detection during grinding, such as some type of a surface roughness detector 309 or a grindstone wear detector 311, are used. Any number of input values from any detectors may be used, and any combination of input values may be used for fuzzy reasoning. Other than the above factors, the detected values of the diameter change of a workpiece and grinding noise may be used as the input values for the fuzzy reasoning.

As an example, fuzzy reasoning may be performed by the following rule: "If the grindstone wear is 'high', the necessity of dressing is large. If the grindstone wear is 'medium', the necessity of dressing is medium. If the grindstone wear is 'low', the necessity of dressing is small".

Also, fuzzy reasoning may be performed according to the following rule: "the surface roughness is 'good', the necessity of dressing is small. If the surface roughness is 'medium', the necessity of dressing is medium. If the surface roughness is 'bad', the necessity of dressing is large."

For the judgment on the necessity of truing, like the judgment on the necessity of dressing, the fuzzy reasoning unit 210 carries out operations, and the operation result is compared with a predetermined reference value in the NC unit 305 or the fuzzy reasoning unit 307. When the result is larger than the reference value, the NC unit automatically activates the dressing cycle and sends an execution command signal 305A to the grinding machine body 301. On receiving the execution command signal 305A, the dresser means 306 automatically comes close to the grinding wheel 303 on the grinding machine body 301 so that dressing is performed.

Although the above-described sixth and seventh embodiments apply to the grinding wheels of grinding machines, this invention can be applied to tools of other various machine tools.

According to the above-described apparatus for achieving the fourth object of this invention, the necessity of dressing or truing can be automatically judged by the application of fuzzy reasoning. This eliminates unnecessary dressing or truing and precludes the need for the work of deciding the dress timing in advance, reducing the work time significantly.

We claim:

1. A method for controlling a spark out starting point in a cylindrical grinding machine comprising the steps of:

determining a first spark out starting point as a temporary spark out starting point by fuzzy reasoning based on a detected value representing grinding conditions during grinding operation before the start of spark out;

performing a simulation to judge whether a finishing dimension is smoothly obtained when assuming spark out at said first spark out starting point;

determining a second spark out starting point by performing fuzzy reasoning again based on smoothness by which said finishing dimension is attained and which is a result of said simulation; and executing spark out at the second spark out starting point.

2. An apparatus for automatically judging the necessity for a change or makeup of coolant on machine tools having a coolant supplying means for supplying coolant to the machining point and a coolant cleaning means for recovering and cleaning the coolant, comprising a sensor for detecting conditions of at least either the coolant or a workpiece, and a fuzzy reasoning unit for automatically judging necessity for at least either the makeup or the change of coolant by fuzzy reasoning based on an inputted value from the sensor.

3. The apparatus of claim 2 including a means for detecting impurities in the coolant and means for detecting surface roughness of the workpiece, said fuzzy reasoning unit being responsive to at least one of said detecting means.

4. An apparatus for automatically judging necessity of dressing on grinding machines having a dresser for performing at least either truing or dressing operation on a grinding wheel and a moving mechanism for relatively moving the grinding wheel and the dresser, comprising a sensor for detecting conditions of at least either a workpiece or the grinding wheel, and a fuzzy reasoning means for automatically judging necessity for at least either the truing or the dressing operation on the grinding wheel by fuzzy reasoning based on an inputted value from the sensor.

* * * * *